United States Patent
Alagha et al.

(10) Patent No.: US 7,593,490 B2
(45) Date of Patent: Sep. 22, 2009

(54) JOINT SYNCHRONIZER AND DECODER

(75) Inventors: Nader S. Alagha, Montreal (CA); Lars Erup, Saint-Lazare (CA)

(73) Assignee: Advantech Advanced Microwave Technologies, Inc., Quebec (CA)

( * ) Notice: Subject to any disclaimer, the term of this patent is extended or adjusted under 35 U.S.C. 154(b) by 904 days.

(21) Appl. No.: 10/938,305

(22) Filed: Sep. 10, 2004

(65) Prior Publication Data

US 2005/0058224 A1   Mar. 17, 2005

Related U.S. Application Data

(60) Provisional application No. 60/502,283, filed on Sep. 12, 2003.

(51) Int. Cl.
*H04L 27/06*   (2006.01)
*H04L 27/00*   (2006.01)

(52) U.S. Cl. .................. 375/341; 375/316; 375/295; 375/340; 375/324; 375/326

(58) Field of Classification Search ............. 375/316, 375/295, 340, 341, 324
See application file for complete search history.

(56) References Cited

U.S. PATENT DOCUMENTS

| | | | |
|---|---|---|---|
| 6,459,888 B1 | 10/2002 | Clark | |
| 6,798,593 B2 * | 9/2004 | Hattori et al. | 360/53 |
| 6,976,203 B2 * | 12/2005 | Kurtas et al. | 714/755 |
| 6,993,070 B1 * | 1/2006 | Berthet et al. | 375/232 |
| 6,996,762 B2 * | 2/2006 | Kuo et al. | 714/749 |
| 7,016,440 B1 * | 3/2006 | Singer et al. | 375/350 |
| 7,058,878 B2 * | 6/2006 | Kanaoka et al. | 714/794 |
| 7,165,210 B2 * | 1/2007 | Nieminen | 714/792 |
| 7,286,517 B2 * | 10/2007 | Brunel | 370/342 |
| 7,333,571 B2 * | 2/2008 | Simon et al. | 375/329 |
| 2001/0043641 A1 | 11/2001 | Harms et al. | |

(Continued)

FOREIGN PATENT DOCUMENTS

WO   PCT/US99/24622   10/1999

(Continued)

OTHER PUBLICATIONS

Lars Erup, M. Cote, "A High-Speed, On-Board Multi-Carrier Demodulator for DVB-RCS Applications", Space Communications (an International Journal) vol. 17, 2001, pp. 193-202.

(Continued)

*Primary Examiner*—Jason M. Perilla
(74) *Attorney, Agent, or Firm*—Michael J. Mehrman; Mehrman Law Office P.C.

(57) ABSTRACT

A joint synchronizer and decoder that implements two decision aided processes, which are referred to as "decision aided candidate selection" and "decision aided synchronization and decoding." Decision aided candidate selection may be used to select a carrier frequency offset by selecting among a number of candidates for this parameter based on an indication of decoding success. Decision aided synchronization and decoding may be used for phase tracking based on an indication of decoding success. Although these joint synchronizing and decoding techniques may be implemented together, they may also be implemented independently. The joint synchronizer and decoder may be implemented within a return channel receiver in a DVB-RCS system using turbo coding and quadrature phase shift key (QPSK) data modulation.

7 Claims, 14 Drawing Sheets

U.S. PATENT DOCUMENTS

| | | | |
|---|---|---|---|
| 2002/0046371 A1* | 4/2002 | Halter | 714/702 |
| 2002/0110206 A1* | 8/2002 | Becker et al. | 375/346 |
| 2002/0154712 A1* | 10/2002 | Cideciyan et al. | 375/341 |
| 2003/0023920 A1* | 1/2003 | Jeong et al. | 714/755 |
| 2003/0053557 A1* | 3/2003 | Simon et al. | 375/308 |
| 2003/0072291 A1* | 4/2003 | Brunel | 370/342 |
| 2003/0093753 A1* | 5/2003 | Okamura et al. | 714/792 |
| 2003/0154441 A1* | 8/2003 | Nieminen | 714/786 |
| 2003/0182617 A1* | 9/2003 | Kanaoka et al. | 714/794 |
| 2004/0064777 A1* | 4/2004 | Kurtas et al. | 714/752 |
| 2004/0105396 A1 | 6/2004 | Eudes et al. | |
| 2004/0148556 A1* | 7/2004 | Hagh et al. | 714/755 |
| 2005/0018794 A1* | 1/2005 | Tang et al. | 375/341 |

FOREIGN PATENT DOCUMENTS

| | | |
|---|---|---|
| WO | PCT/IB01/00636 | 4/2001 |

OTHER PUBLICATIONS

A. Viterbi, A. Viterbi, "Nonlinear estimation of PSK-Modulated Carrier Phase with Application to Burst Digital Transmission" IEEE, vol. IT-29, No. 4, Jul. 1983, pp. 543-551.

C. Morlet, I. Buret, M. Boucheret, "A carrier phase estimator for multi-media satellite payloads suited to RSC coding schemes", ICC 2000—IEEE, No. 1, Jun. 2000, pp. 455-459.

A. Anastasopoulos, K. Chugg, "Adaptive Soft-Input Soft-Output Algorithms for Iterative Detection with Parametric Uncertainty", IEEE, vol. 48, No. 10, Oct. 2000, pp. 1638-1649.

C. Komniakis, R.D. Wesel, "Joint Iterative Channel Estimation and Decoding in Flat Correlated Rayleigh Fading", IEEE, vol. 19, No. 9, Sep. 2001, pp. 1706-1717.

C. Laot, A. Glavieux, J. Labat, "Turbo Equalisation: Adaptive Equalization and Channel Decoding Jointly Optimized", IEEE, vol. 19, No. 9, Sep. 2001, pp. 1744-1752.

M. Valenti, B. Woerner, "Iterative channel estimation and decoding of pilot symbol assisted turbo codes over flat-fading channels", IEEE, vol. 19, #9, Sep. 2001, pp. 1697-1705.

W. Oh, K. Cheun, "Joint decoding and carrier phase recovery algorithm for turbo codes", IEEE Communications Letters, vol. 5, No. 9, Sep. 2001 pp. 375-377.

D'Amico, Antonio A., D'Andrea, Aldo N., and Reggiannini, Ruggero; "Efficient Non-Data-Aided Carrier and Clock Recovery for Satellite DVB at Very Low Signal-to-Noise Ratios". Dec. 2001.

* cited by examiner

TYPICAL FREQUENCY OFFSET = 1% OF SYMBOL RATE

←——— RESULTING PHASE OFFSET = 488% OVER PACKET ———→

TYPICAL BASEBAND DATA RATE = 64 KBAUD (64K SYMBOLS/SEC)

TYPICAL FREQUENCY OFFSET = 1% OF SYMBOL RATE = 640 Hz

JOINT SYNCHRONIZER AND DECODER

CROSS-REFERENCE TO RELATED APPLICATION

This application claims priority to U.S. Provisional Patent Application Ser. No. 60/502,283 entitled "Joint Synchronization and Decoding of Burst Signals" filed on Sep. 12, 2003, the subject matter of which is incorporated by reference. This application is also related to and incorporates by reference U.S. patent application Ser. No. 10/938,299 entitled "Hybrid Frequency Offset Estimator," which is commonly owned and concurrently filed with the present application.

TECHNICAL FIELD

The present invention is directed generally to digital signal processing techniques for burst-mode data signals having short observation lengths in an environment experiencing a low signal-to-noise ratio (SNR). The invention is more particularly but not exclusively directed to a joint synchronizer and decoder (JSD) adapted for use in burst-mode phase shift key (PSK) modulation systems based on the Digital-Video Broadcast Return Channel via Satellite (DVB-RCS) standard.

BACKGROUND OF THE INVENTION

The use of satellites for the transmission of voice and data communication signals has greatly expanded over the past decade, and satellite links are now routinely used and relied upon for global, almost instant, bi-directional communications. Rapid improvements in satellite communications have produced beneficial impacts on many segments of society from business and commercial applications to consumer products. For example, residences throughout the world now receive news and entertainment broadcasts via satellite, in nearly real-time from sites in almost any country.

Burst-mode communication techniques and the related synchronization techniques are frequently used in satellite voice and data transmissions. These systems typically employ multiple transmitters that send "bursts" of transmissions to a receiver. Bursts from the different transmitters are coordinated in time and frequency such that each transmitter can communicate with the receiver without interfering with each other. In one type of burst signal communication, Time Division Multiple Access (TDMA) allows multiple users to share a single carrier wave using time-division multiplexing (TDM) to transmit multiple signals on that carrier wave. TDM divides the carrier wave into time slots and then allocates those time slots to the different data signals. Effectively, each of the data signals takes turns accessing the carrier wave, thereby allowing a single carrier wave to carry multiple simultaneous data transmission. A Multi-Frequency Time Division Multiple Access (MF-TDMA) receiver simultaneously receives TDMA signals on several different carrier frequencies. In the MF-TDMA data transmission scheme, any user can potentially transmit data at any frequency at any time. The actual time slot and frequency allocation to each user is based on capacity requests submitted by the terminal.

Within the TDMA bursts specified in DVB-RCS Standard, the carrier signal is modulated by data symbols in which a phase characteristic of the symbol represents the data. This type of modulation technique is known as "phase shift keying" data modulation. In general, each symbol can be represented as a phasor in which the phase state of the symbol at the correct detection instant, or the relative change in phase from symbol to symbol, represents data. This data, in turn, can be expressed as a corresponding bit or combination of bits in which the number of bits corresponds to the number of possible phase states used for data modulation. For example, in binary phase shift keying (BPSK), each symbol may have one of two phase states (i.e., 0, π). Each BPSK symbol can therefore represent a single binary digit (bit). In quadrature phase shift keying (QPSK), each symbol may have one of four phase states (i.e., 0, π/2, π and 3π/2). Each QPSK symbol can therefore represent two binary digits. In the general "M" phase shift keying (MPSK), each symbol may have "m" phase states. Each MPSK symbol can therefore represent "n" binary digits, where $M=2^n$.

Typically, MF-TDMA signals are de-multiplexed and re-arranged to form a signal equivalent to a single carrier. The single-carrier data signal is then demodulated to recover the underlying data. The demultiplexing and demodulation steps are well known in the field of communications and are the subject of extensive research and development to improve transmission speeds, bandwidth, accuracy, and reliability.

Several satellite data transmission standards have been adopted to harmonize the transmission and reception of satellite communications broadcasts. One known standard adopted in the broadcast of Digital Video Broadcast (DVB) signals is the Digital Video Broadcast by Satellite (DVB-S). Standard EN 300 421 of the ETSI (European Telecommunications Standards Institute). This standard relates to DVB services and transparent satellite communication systems to provide DVB-S services directly to the user through an integrated receiver/decoder device that is located in the user's home. The versatility of DVB-S in multiplexing permits the use of a transmission capacity encompassing a variety of television service configurations, including sound and data services.

The components of the DVB-S services are transmitted on a TDM carrier wave. For more information on the DVB-S standard, please refer to ETSI publication EN 300 421 V1.1.2 (1997-98), entitled "Digital Video Broadcasting (DVB); Framing Structure, Channel Coding and Modulation for 11/12 GHz Satellite Services," the subject matter of which is hereby incorporated herein by reference.

Satellite broadcasts are also increasingly used for instantaneous two-way audio, video, and data communications. Accordingly, recent attention has been given to the demand for making satellite communications interactive so that recipients of the broadcast can also communicate back to the origin of the transmission. For example, satellite communications can be used to provide Internet connections between different users. In an effort to establish unified bi-directional satellite communications, the digital video broadcast with return channel by satellite (DVB-RCS) standard has been enacted by the ETSI.

The DVB-RCS standard relates to interaction channels on a satellite distribution system. The purpose of this standard is to provide basic specifications for providing interaction channels for interactive networks based on geostationary (GEO) satellites that incorporate return channel satellite terminals (RCST). The DVB-RCS standard facilitates the use of RCSTs for domestic installations both individual and collective types. The DVB-RCS standard likewise supports the connection of the terminals with home data networks, and can be applied to all frequency bands allocated to GEO satellite services. For more information on the DVB-RCS standard, refer to ETSI publication, EN 301 790 v.1.3.1, dated 2003-03, entitled "Digital Video Broadcasting (DVB); Interaction Channel for Satellite Distribution Systems," the subject matter of which is hereby incorporated herein by reference.

Satellite communication systems operating under the DVB-RCS standard can exchange data using a variety of network and Internet technologies. For example, the DVB-RCS standard accommodates Asynchronous Transfer Mode (ATM) technology for transferring data in cells or packets of a fixed size. The data packet used with ATM is relatively small compared to packets used with older technologies. The small, constant packet size allows ATM equipment to transmit video, audio, and computer data over the same network, and helps assure fairness. ATM creates a fixed channel, or route, between two points whenever data transfer begins, unlike TCP/IP that divides messages into packets that can each take a different route from source to destination. The DVB-RCS standard may also be used to transmit MPEGs (Moving Picture Experts Group), a family of digital video compression standards and file formats that achieve high compression rate by storing only the changes from one frame to another, instead of each entire frame.

Loss of bursts (or packets), as measured by packet loss ratio, is a main performance criterion under DVB-RCS. Due to a long propagation delay in geostationary satellite communications, the packet loss ratio should be low in order to avoid performance degradation at higher network layers. The human senses are generally tolerant of slight variations, so for the transmission of video and sound broadcasts, as defined by DVB-RCS, the packet loss ratios is preferably in the order of $1\times 10^{-5}$, so that less than one packet is lost per hundred-thousand burst signals. For more stringent types of data transmissions, a lower packet loss may be needed, such as $1\times 10^{-7}$, where less than 1 packet is lost per ten million packet transmissions.

One way to decrease the packet loss is to increase the signal transmission strength or effective isotropic radiated Power (EIRP) of the transmitter, thereby increasing the signal-to-noise ratio at the receiver. Improvements in the signal-to-noise ratio are desirable because, as provided by Shannon's theorem, the ultimate theoretical limit to the data transmission transfer rate on a communications channel is directly proportional the signal-to-noise ratio of that channel. Consequently, increasing the power transmitted on the return channel can often be a solution to provide adequately reliable communications. However, increasing the transmission power of the receiver unacceptably increases the cost of the receiver. Accordingly, there is a current need for a demodulation technology that allows reliable communications over a low-power burst-mode signal experiencing a low signal-to-noise ratio. More specifically, there is a current need for a demodulation technology that allows for sufficiently low packet loss rates for transmission in a DVB-RCS system while maintaining or even reducing current terminal transmission power levels in order to minimize the cost of user terminals.

Another important aspect of DVB-RCS system application is the provision of services at $K_a$-band frequencies (e.g., 30 GHz uplink from terminals to satellite). The cost of the user terminal plays a major role in the business model of this type of services. RF components of the terminals are costly. Less expensive RF components result in tighter link budget on the uplink from the terminal to satellite. For this application, the use of very power efficient modems is essential in order to maintain acceptable level of system availability.

Thus, there exist a further need for a demodulating technology that allows for sufficiently low packet loss ratio for DVB-RCS transmissions with a higher power efficiency. As suggested above, numerous technical and physical problems complicate the synchronization in satellite communications. For instance, the synchronization may be difficult where the transmitter and receiver are moving relative to each other. Specifically, when a burst-mode communications transmitter is on or near the earth and the intended receiver is in a satellite (or when a satellite transmits to the terrestrial receiver), the spatial locations and the relative velocities of the transmitter and receiver change over time. The change in spatial location causes the propagation path length and the signal propagation time to change, and the change in relative velocities causes a Doppler frequency to change the frequency of the burst-mode signal when it is received at the intended receiver. As a consequence, the burst-mode signals, originally transmitted at fixed intervals, arrive at varying time intervals. Furthermore, varying weather conditions, such as clouds and rain, also affect the communication signals. There is also certain level of inherent carrier frequency uncertainty at the transmitter output. Overall, these and other conditions cause carrier frequency offset in the burst-mode communications.

These issues are particularly present in DVB-RCS communications. At a DVB-RCS transmitter output, a 30 GHz carrier will generally appear with some carrier frequency offset $f_o$, or residual error, so that carrier frequency $(f_c)=30$ GHz$\pm f_o$. As suggested above, contributors to the carrier frequency offset include movement of the satellite which creates a satellite Doppler effect, uncertainty due to the satellite's transponder, uncertainty or changes at the transmitter as to the exact carrier frequency, and length and atmospheric conditions en route. These and other contributors in the system deviate the carrier off its nominal value and synchronization is performed to correct for the carrier frequency offset and get the carrier back to its nominal or baseband state. In a sense, synchronization is a fine-tuning value for best receiver performance.

Accordingly, the synchronization process generally includes signal detection, finding the right timing (i.e., the symbol timing), finding the carrier frequency offset, and tracking the carrier phase. After the right combination of these factors is determined, thereby enabling synchronization, the data signal is demodulated from the carrier wave and the encoded symbols represented by the data signal is passed to a decoder to extract and deliver the payload data in the burst.

In synchronous digital transmission, information is conveyed by uniformly spaced pulses and the function of any receiver is to isolate these pulses as accurately as possible. However, the received signal has undergone changes during transmission due to the noisy nature of the transmission channel, resulting in signal distortion, such as carrier frequency offset and phase noise. Complete estimation and removal of these sources of signal distortion is necessary prior to data detection. A proper synchronization of a burst signal is needed to decode the transmitted data, and this process typically involves the identification, estimation and removal of these sources of signal distortion.

Conventional synchronization methods usually operate at relatively high signal-to-noise ratio that allow reliable synchronization. In addition, conventional burst signal demodulation techniques perform synchronization and then the decoding in a serial manner. For this reason, a receiver generally includes a cascade of receiving filter, synchronization, and decoding to process received burst signals. Since the return channel is operating at a very low signal-to-noise ratio, carrier synchronization using this traditional approach cannot alone give the right signal constellation. The currently known techniques for improving synchronization estimations generally rely on certain threshold criteria, such as having a sufficiently high signal-to-noise ratio, to determine the points where the synchronization problem occurs. When falling below the threshold value, the conventional algorithms fail to operate properly. Much of the current research and development is directed toward developing techniques to reduce this threshold level.

Theoretical studies can be conducted on existing estimators to determine their fundamental performance level, or their baseline, and this type of measurement may give some sort of theoretical bound for the performance of known techniques and algorithms used for parameter estimation. The theoretical limits to the performance of existing estimator designs (i.e., the performance under ideal situations) are inadequate to meet the needs of a faint burst-mode signals transmitted at a low power level, such as a return link channel in a DVB-RCS system.

As a result, there is an on-going need for techniques and systems for detecting and correcting for signal distortion, such as the carrier frequency offset and phase noise, that typically affect a burst-mode satellite communication system experiencing a low signal-to-noise ratio.

SUMMARY OF THE INVENTION

The present invention meets the needs described above in a joint synchronizer and decoder (JSD) that elects among multiple candidates for a signal distortion parameter based on a measure of decoding success. This process, which is referred to as "decision aided candidate selection," increases the likelihood of selecting the correct estimate of the signal distortion parameter when the signal-to-noise ratio declines to the point where the noise may mask the signal distortion parameter. As a result, a receiver utilizing this technology can identify the correct signal distortion parameter, and thereby maintain synchronization, at a lower signal-to-noise ratio than a conventional receiver. This, in turn, allows the transmitter to meet a required data loss standard at a lower power level and cost, which is particularly advantageous in a system with price sensitive transmitters such as return channel transmitters in a satellite communication systems operating under the DBV-RCS standard.

In a particular embodiment, one source of signal distortion is carrier frequency offset, and the carrier frequency offset candidates represent several of the largest local maxima values in a modulation-free frequency spectrum of the input signal. In this case, selecting among multiple candidates for the carrier frequency offset increases the likelihood of selecting the correct carrier frequency offset when the signal-to-noise ratio declines to the point where the largest frequency in the modulation-free frequency spectrum may correspond to noise, rather than to the correct carrier frequency offset. But the JSD itself is independent of the source of estimates of the signal distortion, and may be used to process multiple candidates for sources of signal distortion other than carrier frequency offset.

In the phase tracking embodiment described above, the JSD may also implement a feedback loop in the decoding and phase tracking process referred to as "decision directed phase tracking." In this process, an indicator of decoding success is used as a feedback parameter in the phase tracking process. This allows the carrier phase to be adjusted iteratively through a feedback loop in response to measured success of the decoding process. This invention represents a major improvement in synchronization technology for burst-mode communication systems, which again allows the transmitter to meet a required data loss standard at a lower the power level and cost.

Generally described, the invention may be implemented as a JSD that operates on an input signal modulated with encoded data. The JSD includes a number of channel observation modifiers that each receives an associated candidate signal distortion indicator and channel observations associated with the input signal. Each channel observation modifier also produces modified channel observations including the encoded data based on the associated candidate signal distortion indicator and the channel observations. The JSD also includes a synchronization processor associated with each channel observation modifier. Each synchronization processor receives modified channel observations from its associated channel observation modifier, synchronizes to the modified channel observations received from its associated channel observation modifier, and produces corrected channel observations. The JSD also includes a partial decoder associated with each synchronization processor. Each partial decoder partially decodes the encoded data embedded within the corrected channel observations received from its associated synchronization processor and produces an associated indication of decoding success. This allows a branch selector to select a signal distortion indicator for decode processing based on a comparison of the indications of decoding success received from the partial decoders.

The invention may also be practiced as a JSD that includes an iterative processor that receives and synchronizes to channel observations associated with an input signal. The iterative processor includes a decoder that decodes the synchronized channel observations received from a synchronization processor and produces an associated indication of decoding success. The iterative processor also includes a feedback loop that supplies the indication of decoding success to the synchronization processor. This allows the synchronization processor to adjust its synchronization to the channel observations based on the indication of decoding success. The iterative processor may also include a soft decision aided synchronization processor operative for computing a synchronization parameter based on the indication of decoding success. The soft decision aided synchronization processor also computes corrected channel observations based on the input channel observations and the synchronization parameter.

In particular, the input signal to the JSD may include burst-mode multi-frequency time division multiplexed (MF-TDMA) data in which the data signal is encoded using a quadrature phase shift key (QPSK) modulation technique in accordance with the digital video broadcast return channel via satellite(DVB-RCS) standard. The JSD may also include a channel observer for processing the input signal to produce the channel observations. More specifically, the channel observer may include a front-end analog processor that amplifies the input signal, down-converts the amplified input signal to obtain an intermediate frequency signal, and filters the intermediate frequency signal. The channel observer may also include a digital preliminary processor that digitizes a representation of the input signal to obtain a digital MF-TDMA signal, demultiplexes the MF-TDMA signal to obtain a concatenated single-channel TDMA signal, and detects burst-mode data packets within the single-channel TDMA signal to obtain the channel observations.

In addition, the encoded data typically includes a number of symbols, the indication of decoding success typically includes a log likelihood ratio (LLR) produced by the partial decoder for each symbol, and the branch selector typically selects a signal distortion indicator based on the highest average log likelihood ratio for each symbol over a common range of the symbols. These symbols typically have phase components modulated by the encoded data.

In a particular embodiment configured for correction of carrier frequency and phase offsets, the JSD includes a number of frequency correctors. Each frequency corrector receives an associated carrier frequency offset candidate and channel observations associated with the input signal. Each frequency corrector also produces modified. channel observations including the encoded data based on the associated carrier frequency offset candidate and the channel observations. The JSD also includes an initial phase estimator and corrector configured to initialize the modified channel observations to an initial phase.

This embodiment of the JSD also includes a phase tracking module associated with each frequency corrector. Each phase tracking module synchronizes to the initialized and modified channel observations received from its associated initial phase estimator and corrector to produce phase corrected channel observations. The JSD also includes a partial decoder associated with each phase tracking module. Each partial decoder partially decodes the encoded data embedded within the phase corrected channel observations received from its associated phase tracking module and produces an associated indication of decoding success. The JSD also includes a branch selector that selects a carrier frequency offset candidate for decode processing based on a comparison of the indications of decoding success received from the partial decoders.

For this example, the invention may also be practiced as a JSD that includes a decoder assisted phase tracker. This module receives and synchronizes to channel observations associated with the input signal and produces phase corrected channel observations. The JSD also includes a decoder that decodes the phase corrected channel observations received from the decoder assisted phase tracker and produces an associated indication of decoding success. The JSD also includes a feedback loop that supplies the indication of decoding success to the decoder assisted phase tracker. This allows the decoder assisted phase tracker to adjust its synchronization to the channel observations based on the indication of decoding success.

In this example, the indication of decoding success typically includes a log likelihood ratio produced by the decoder. In addition, the encoded data typically defines systematic bits representing unknown data and parity bits derived from the systematic bits. In this case, the decoder assisted phase tracker may include a soft decision aided phase tracker that computes a phase tracking parameter based on the systematic bits and the indication of decoding success. The soft decision aided phase tracker may also compute corrected channel observations based on the systematic bits and the phase tracking parameter. The decoder assisted phase tracker may also include a phase tracking module that receives the phase tracking parameter from the soft decision aided phase tracker and computes a corrected channel observations based on the parity bits and the phase tracking parameter. In this case, the decoder assisted phase tracker also includes a switch that feeds the systematic bits to the soft decision aided phase tracker. The switch also feeds the parity bits to the phase tracking module.

The phase tracking module also typically includes a feedback loop that includes a phase tracking parameter associated with the corrected channel observations. In addition, the soft decision aided phase tracker typically computes the phase tracking parameter by removing modulation from the channel observations, obtaining a resultant signal by weighting the modulation-free channel observations by a representation of the indication of decoding success, and computing a sliding average of the resultant signal.

Other features and advantages of the present invention will be readily appreciated upon review of the following detailed description when taken in conjunction with the accompanying drawing figures.

DETAILED DESCRIPTION OF THE PREFERRED EMBODIMENTS

Figure 1:
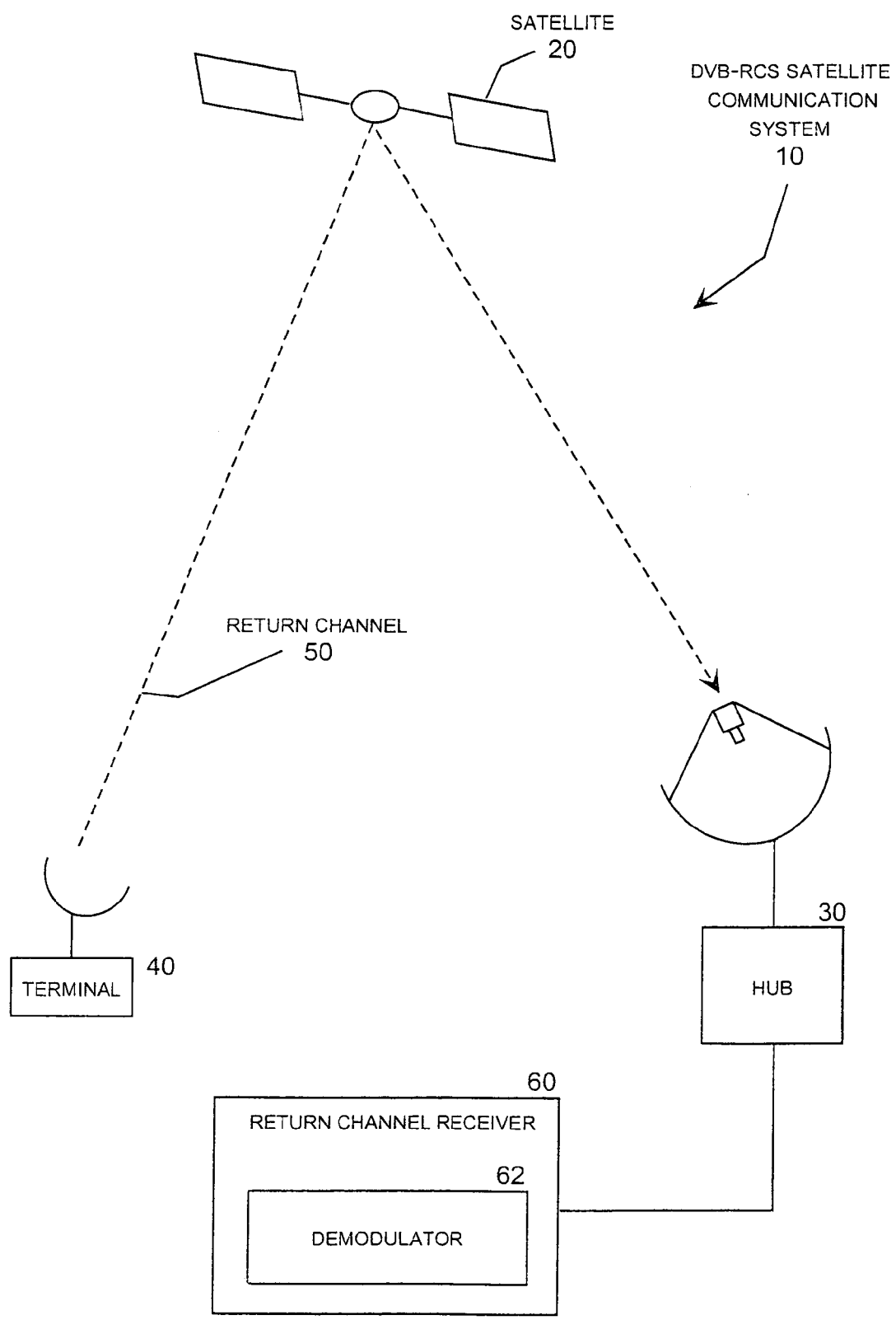
FIG. 1 is a block diagram of a satellite communication system in which the present invention may be deployed.

The main objective of the joint synchronizer and decoder (JDS) described below is to improve the power efficiency of burst-mode transmission of encoded data. Recent advancement in error correction coding techniques used over communication channels has made it possible to lower the transmitted power requirement to achieve a target performance for a given channel condition. Using schemes such as iterative decoding of turbo codes and Low Density Parity Check (LDPC) codes, the power requirements approach theoretical lower bounds established by channel capacity.

In a conventional coherent detection and decoding of encoded signal, it is essential to correct the channel observation for signal distortion, such as inter-symbol interference, carrier frequency offset, and phase noise prior to signal decoding. In particular, for burst-mode data transmission over satellite, the lack of accurate carrier frequency and phase synchronization can cause performance degradations that overshadow the strength of the error correction techniques. By using the improved error correcting technique of the JSD, acceptable data loss rates can typically be achieved at lower a signal-to-noise ratio than the threshold of conventional carrier synchronization circuits.

The rationale for the decoder assisted frequency correction is to allow the production of high quality parameter estimates at a low signal-to-noise ratio. A parameter that plays important role in synchronization is the carrier frequency offset. It is essential to obtain an accurate estimate of the carrier frequency offset and correct the channel observations accordingly before actual signal decoding. For the JSD described below, it is assumed that more than one candidate for the carrier frequency offset is available. It should be noted that a single estimate based on conventional estimation rules that ignore the underlying coding structure are occasionally far from the true value. This type of error in estimation is sometimes referred to as an "outlier." Unfortunately, the probability of encountering an outlier increases when the signal-to-noise ratio decreases. The JSD takes advantage of the recognition that it is highly likely that the right estimate can be found among a fairly small number of candidates.

The proposed JSD takes advantage of the log-likelihood ratios (LLR) output from the soft-input-soft-output decoding algorithms as indications of decoding success. That is, the soft decision outputs (LLR values) of each decoder are used to establish a measure of likelihood of decoding success, so that one branch exhibiting the best indication of decoding success based on partial decoding can be selected for further processing. The mean absolute value of the soft decisions (LLR values) is used as a measure of merit of each branch. The soft decision values are computed for both systematic and parity bits. A branch with a small frequency estimate error is more likely to have a high average soft-decision value. Based on simulation results, one or two iterations of decoding in each branch is adequate to establish a good likelihood measure.

This JSD also implements methods for iterative improvement of channel observation based on an estimate of the carrier phase within each iteration loop. In order to modify the phase estimates, the soft decision values provided by the decoders are used to estimate and correct the phase variation over a block of channel observation.

More specifically described, the JSD typically implements two decision aided processes, which are referred to as "decision aided candidate selection" and "decision aided synchronization and decoding." For example, "decision aided candidate selection" may be used to select a carrier frequency offset by selecting among a number of candidates for this parameter based on an indication of decoding success. Similarly, "decision aided synchronization and decoding" may be used for phase tracking based on an indication of decoding success. Although these joint synchronizing and decoding techniques may be implemented together, they may also be implemented independently.

The JSD shown in the accompanying figures and described below as a joint synchronizer and decoder within a return channel receiver in a DVB-RCS system using turbo coding and quadrature phase shift keying (QPSK) data modulation. In this system, the JSD is employed to track and remove signal distortion caused by carrier frequency offset so that this particular source of signal distortion can be removed to improve the ability of the receiver to maintain synchronization in low signal-to-noise conditions. This, in turn, allows the receiver to meet typical DVB-RCS data loss requirements without increasing the transmission power of the return channel transmitter. Of course, carrier frequency offset is an important source of signal distortion in any communication system using a phase shift keying modulation technique because the carrier frequency offset directly influences the phase characteristic of the modulating signal. Nevertheless, is should be appreciated that the invention may be applied to the identification and removal of other types of signal distortion that may be more significant in other types of communications systems.

It should also be appreciated that the JSD may be applied to track and remove other types of signal distortion, such as phase noise or the combination of phase noise and carrier frequency offset, in any type of suitable device, such as a return channel receiver operating in accordance with the DVB-RCS standard. Accordingly, it should be understood that carrier frequency offset correction is one important application of the JSD, but that it may also be used to track and remove other types of signal distortion, and may be used for modulation systems other than phase shift keying.

Similarly, the JSD is described below in the context of a return channel receiver operating in accordance with the DVB-RCS standard, but may operate under other standards. Furthermore, the JSD is shown as operating in the return channel receiver of a ground-station hub of within a "bent pipe" satellite communication system, which is an important application of the invention. But the invention may also be deployed as on board processing (OBP) on the satellite or other communication platform, such as an airplane, missile or spacecraft. Embodiments of the invention may also be deployed in a terminal-to-terminal "mesh" communication system, or in any other suitable type of communication system.

The DVB-RCS standard relies on MF-TDMA burst-mode, packetized communications using quadrature phase shift key (QPSK) data modulation. Within this system, individual data packets are turbo decoded and include known symbols in a preamble and unknown data in a payload. A typical preamble length is 48 symbols. A typical length of the unknown payload portion of the data packet is 440 symbols. It should be understood that these parameters may all be varied for embodiments of the invention utilizing different communication techniques. In particular, known symbols, also referred to as "pilot" symbols, need not be located with a data packet preamble, but may be located anywhere within, and may be distributed throughout, the data packet.

At present, an important purpose for deploying the JSD is to minimize the required return channel transmission power required to maintain acceptable data loss levels for a satellite communications system operating under the DVB-RCS standard. Nevertheless, by tracking and removing carrier frequency offset, the invention improves communication synchronization even in situations when increasing the return channel transmission power alone may not be successful. This situation may occur, for example, during rain fade conditions or other circumstances that increase or cause fluctuations in the carrier frequency offset.

In addition, signal distortion indicators, such as carrier frequency offset candidates, processed by embodiments of the present invention are preferably received from a particular embodiment of a signal distortion estimator as described in U.S. patent application Ser. No. 10/938,299 entitled "Hybrid Frequency Offset Estimator," which is incorporated herein by reference. Nevertheless, it should be appreciated that the signal distortion indicators could be received from any other suitable type of device. Further, the signal distortion estimator, such as a hybrid frequency offset estimator, and the JSD may be integrated into a single piece of equipment or they may be distributed. For example, the signal distortion estimator may be located on a satellite as on-board-processing (OBP) equipment, whereas the JSD may be located in ground-based receiver configured as customer premises equipment (CPE). Of course, any other division of data processing functionality may be deployed to suit a particular application.

It should also be appreciated that carrier phase and frequency synchronization is but one kind of synchronization, and that turbo decoding is but one kind of decoding scheme that may be applied to burst signals. Thus, the particular architecture described, while presented as applied to a DVB-RCS system using these technologies, is not limited to DVB-RCS and has application in other systems faced with the same or similar types of problems. Also, the invention can be applied to any type of iterative decoding principle but is not limited to turbo decoding nor to any particular type of turbo decoding. The method described can be used for different types of coding; likewise, while the embodiment discussed is that of a carrier synchronization, this again is but one part of "synchronization," and the idea can also be generalized so that for any particular part of synchronization that is lacking the necessary performance, the joint collaboration between decoding and synchronization of this invention can be equally applied.

Also, regardless of the type of synchronization and signals being decoded, the method taught does apply to burst-mode signals in every instance. For example, an embodiment of the invention may be applied to a continuous mode of data transmission. The principles of the invention taught herein with respect to burst-mode signals may also find application to other types of transmissions and the described method and structure is not to be taken as necessarily limiting in this regard. Nevertheless, it should also be appreciated that the problem sought to be overcome by the invention occurs when there are very short observations of the signal, which occurs with a TDMA burst-mode type of signal. This is when joint synchronization and decoding come into the picture most acutely.

As shown in the embodiments described below, the carrier frequency offset estimator module and the JSD module conveniently interface at the output of the frequency offset estimator module, which typically outputs several candidate values for the carrier frequency offset. The number of candidates produced by the carrier frequency offset estimator could be any number the designer chooses, realizing that the system complexity grows with an increase in this number. Three candidates are used in the exemplary embodiments. However, any number of candidates could produced depending on the particular application of the invention.

Referring now to the figures, in which like numerals refer to like elements throughout the several figures, FIG. 1 is a block diagram of a "bent pipe" satellite communication system 10 in which the present invention may be deployed. This type of satellite communication system includes a satellite 20, a number of ground station hubs represented by the hub 30 and a larger number of end-user terminals represented by the terminal 40. For example, this simplified configuration is typical of satellite-based broadcast television systems in which the hub 30 broadcasts television signals to the terminal 40 under the DVB-S standard. As noted previously, it is also advantageous to use this infrastructure for bi-directional communications under the DVB-RCS standard, for example to implement interactive television or Internet service for the receivers. For this application, the terminal 40 typically sends return channel communications 50 back to the hub 30, which includes a return channel receiver 60 configured to receive and decode these communications. The invention may be embodied within a demodulator 62, which typically includes a signal distortion estimator such as a carrier frequency offset estimator, deployed within the return channel receiver 60.

The DVB-RCS standard specifies the characteristics of the return channel communications 50, which are in multi-frequency time division multiple access (MF-TDMA) burst-mode packet format using quadrature phase shift key (QPSK). data modulation. The encoded data is preferably decoded using turbo decoding techniques, which are well known in the field of satellite communications. In this system, the present invention may be embodied as a frequency offset estimator within the return channel receiver 60. The challenge is to reliably determine the carrier frequency offset in return channel signal 50, and thereby allow the return channel receiver 60 maintain synchronism with the return channel.

In particular, the objective includes meting the typical DVB-RCS packet loss criteria of $1 \times 10^{-5}$ (less than one packet is lost per hundred-thousand burst signals) and $1 \times 10^{-7}$ (less than 1 packet is lost per ten million packet transmissions), as appropriate, without having to increase the return channel transmission power of the terminal 40. This objective becomes increasingly challenging as the signal-to-noise ratio decreases (i.e., the return channel signal 50 becomes increasingly faint). The faint return signal problem can be compounded when conditions cause the carrier frequency offset fluctuate, which can occur, for example, during fluctuating cloud and rain fade conditions.

Figure 2:
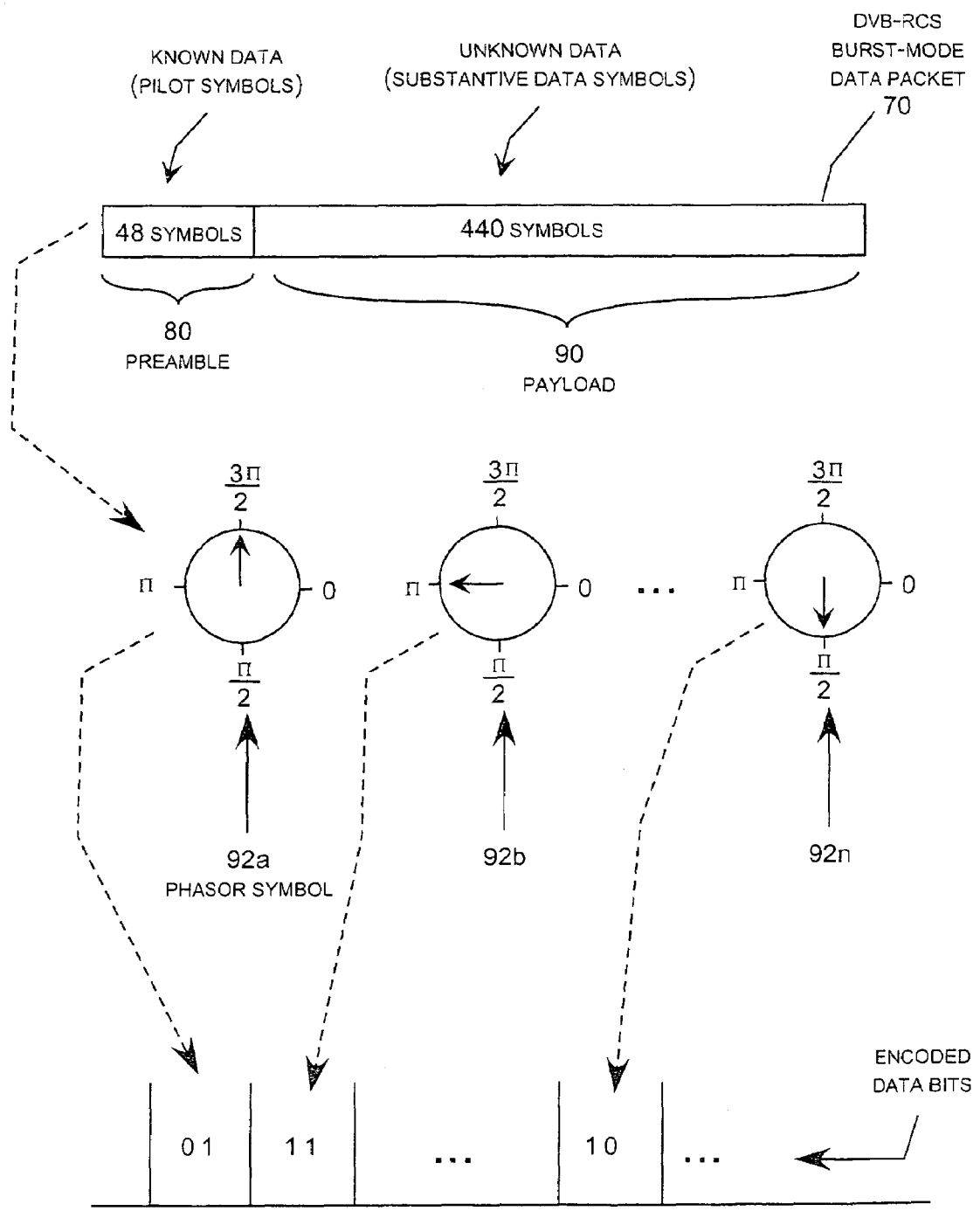
FIG. 2 is a conceptual drawing of the prior art showing a burst-mode data packet illustrating quadrature phase shift keying as a data modulation technique.

FIG. 2 is a conceptual drawing of a burst-mode data packet 70 illustrating the quadrature phase shift keying (QPSK) data modulation technique specified by the DVB-RCS standard. The data packet 70 includes a 48 symbol preamble 80 followed by a 440 symbol payload 90. The preamble 80 includes pilot symbols, which are specified in advance and known by the receiver. In general, any number of pilot symbols may be located anywhere or distributed throughout the data packet 70, but the DVB-RCS standard specifies that pilot symbols are located in a preamble 80 of the data packet. These known symbols are typically used for signal detection, synchronization, and so forth. The payload 90 includes the unknown data of the underlying, substantive data transmission. The symbols of the payload 90 may also include substantive data as well as error checking or other bits used for administration of the system. In particular, the payload 90 under the DVB-RCS standard includes "systematic bits" defining substantive data as wells as "parity bits" used for error checking.

As illustrated in FIG. 2, each symbol in the data packet 70 is a phasor, represented by the phasors 92a-n, in which modulating data is expressed as the symbol phase angle. Under the QPSK data modulation technique, each symbol may have four states (i.e., 0, $\pi/2$, $\pi$ and $3\pi/2$). Thus, each symbol may be translated into a two-bit binary representation. For the BSPK data modulation technique, each symbol may have two states (i.e., 0, $\pi$) and can therefore be represented by a single binary bit. For the generalized MSPK data modulation technique, each symbol may have "M" states and can therefore be represented by "n" binary bits where $M=2^n$. The symbols are generally represented by the designation $Z(n)$, and a sample or measurement of the symbol is generally referred to as "channel observations" represented by the designation $Z'(n)$. That is, the nominal, intended or undistorted baseband data signal is generally represented by the designation $Z(n)$, whereas the actual (distorted or corrupted) channel observations (for example as distorted or corrupted by the carrier frequency offset) is generally represented by the designation Z'(n). The signal processing operation of the signal distortion estimator can, therefore, be expressed as detecting candidates for the carrier frequency offset in the channel observations Z'(n) which are used to reconstruct estimates of the undistorted symbol sequence Z(n).

Figure 3:
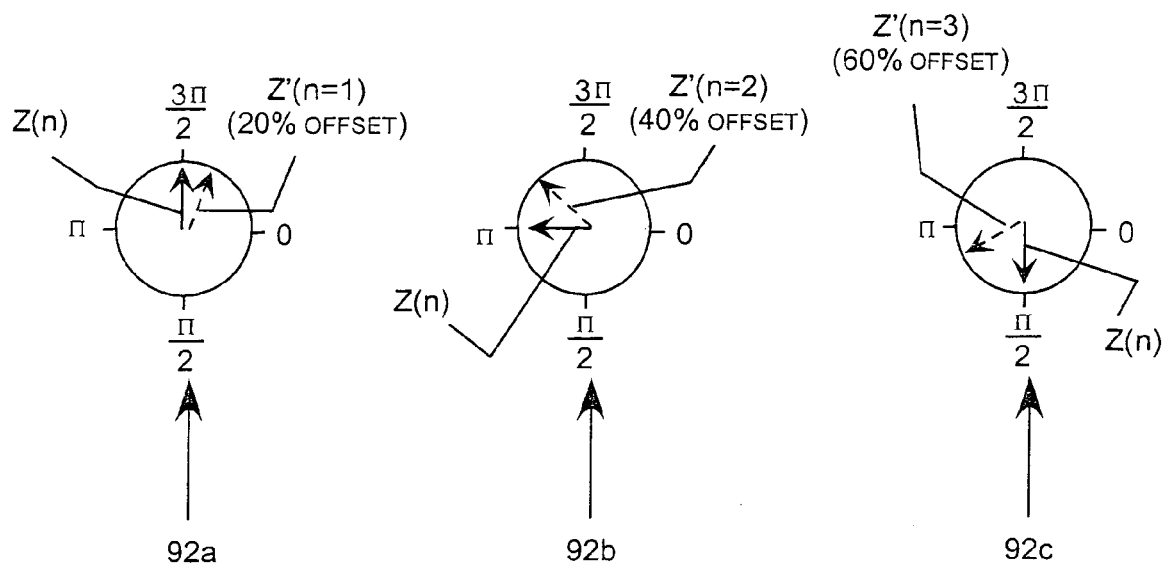
FIG. 3 is a conceptual drawing of the prior art showing data symbols illustrating the signal distortion effect of a carrier frequency offset.

FIG. 3 is a conceptual drawing of data symbols illustrating the signal distortion effect of a carrier frequency offset. Specifically, the carrier frequency offset causes the symbol phase angle to be offset (rotated) slightly from its nominal or expected value. For a one percent (1%) carrier frequency offset, for example, the symbol phase angle is offset by one percent or 3.6°. A frequency offset accumulates in phase over time, which causes the phase offset within a data packet to increase from symbol to symbol. For example, a one percent (1%) carrier frequency offset will cause the symbol phase angle error to rotate around a complete 360° cycle every 100 symbols. For a data DVB-RCS packet of 488 symbols, this translates into 4.88 complete cycles of phase error over the data packet, which makes the underlying impossible to demodulate unless the carrier frequency offset is detected and removed from the input signal.

Figure 4:
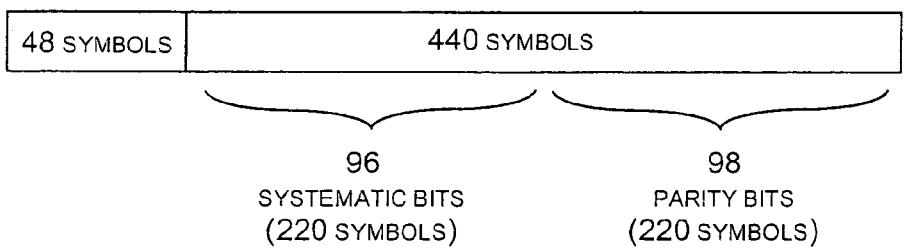
FIG. 4 is a conceptual drawing of the prior art showing a burst-mode data packet illustrating a measure for carrier frequency offset.

FIG. 4 is a conceptual drawing of a burst-mode data packet illustrating a measure for carrier frequency offset. A typical baseband data rate for the data packet 70 is 64 kBaud (i.e., 64,000 symbols per second). For a one percent (1%) carrier frequency offset, this translates into a 640 Hz carrier frequency offset (i.e., 0.01×64,000=640 Hz). This is the signal distortion parameter that the signal distortion estimator of the present invention is designed to detect for removal by downstream processing by the JSD. Because this signal distortion parameter may be masked by noise when the signal-to-noise ratio decreases, the signal distortion estimator typically provides several candidate values for the signal distortion parameter, which the decoder tests in order to select the correct candidate. In the particular embodiment described in more detail below, the carrier frequency offset is the signal distortion parameter for which the carrier frequency offset estimator produces three candidate values using a hybrid data-aided and non-data-aided signal processing technique. The JSD then selects a most likely candidate based on an indication of decoding success and decodes the modulating data from the channel observations using the selected candidate, as described in greater detail below.

Figure 5:
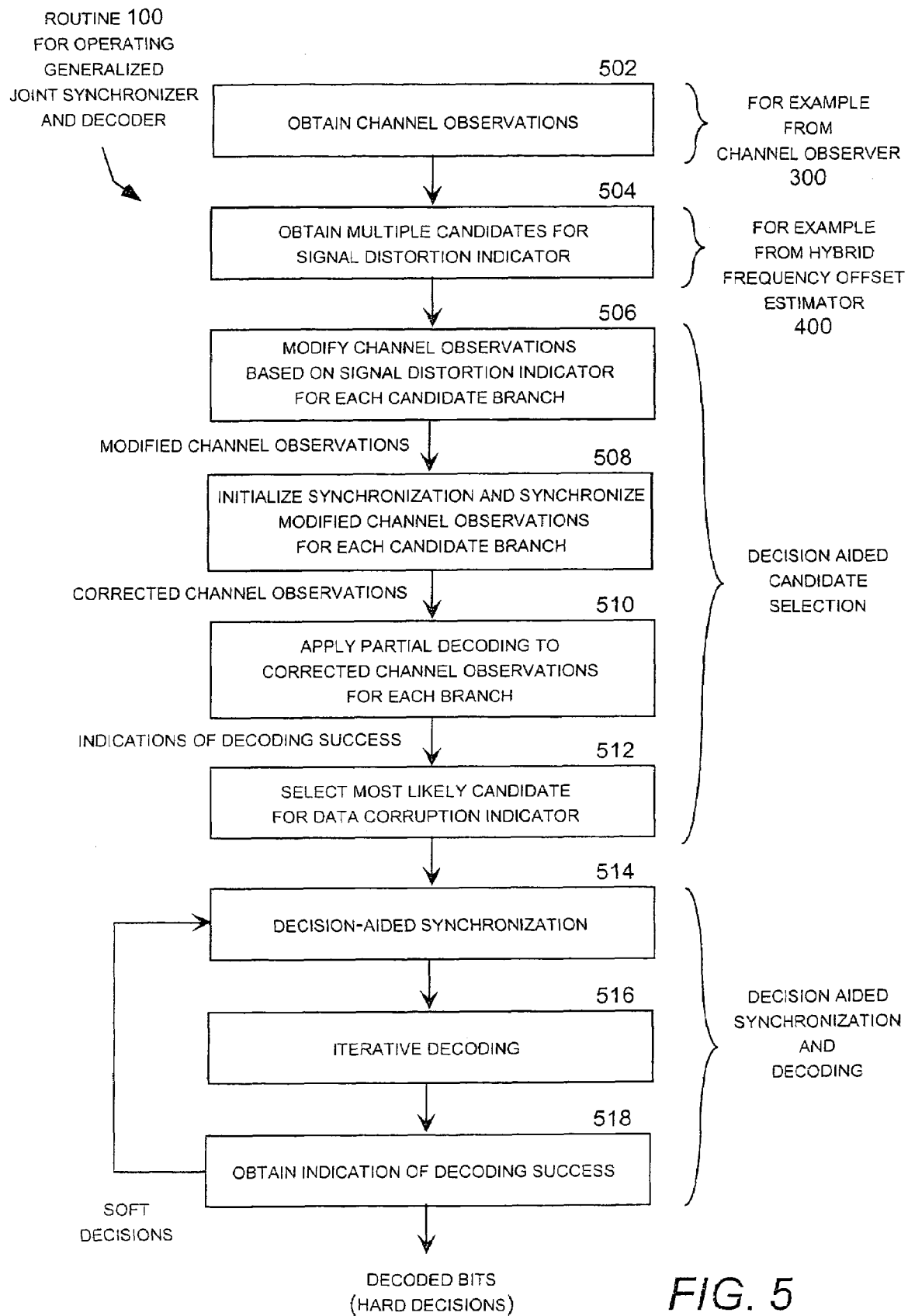
FIG. 5 is a logic flow diagram illustrating a method for operating a generalized joint synchronizer and decoder.

FIG. 5 is a logic flow diagram illustrating a method for operating a generalized JSD. In step 502, the JSD obtains channel observations associated with an input signal. Step 502 is followed by step 504, in which the JSD obtains multiple candidates for a signal distortion indicator associated with the input signal. Step 504 is followed by step 506, in which the JSD modifies the channel observations based on the signal distortion indicators to obtain modified channel observations for several processing branches in which each branch corresponds to one of the signal distortion indicator. Step 506 is followed by step 508, in which the JSD performs initial and additional synchronization on the modified channel observations to obtain corrected channel observations for each processing branch. Step 508 is followed by step 510, in which the JSD applies partial decoding to the corrected channel observations to obtain an indication of decoding success for each processing branch. Step 510 is followed by step 512, in which the JSD selects a processing branch with a most likely candidate signal distortion indicator for decode processing based on an analysis of the indications of decoding success for the several processing branches. Steps 506 through 512 are also referred to jointly as "decision aided candidate selection" to indicate that indications of decoding success are used to select a candidate signal distortion indicator for decode processing.

Figure 6:
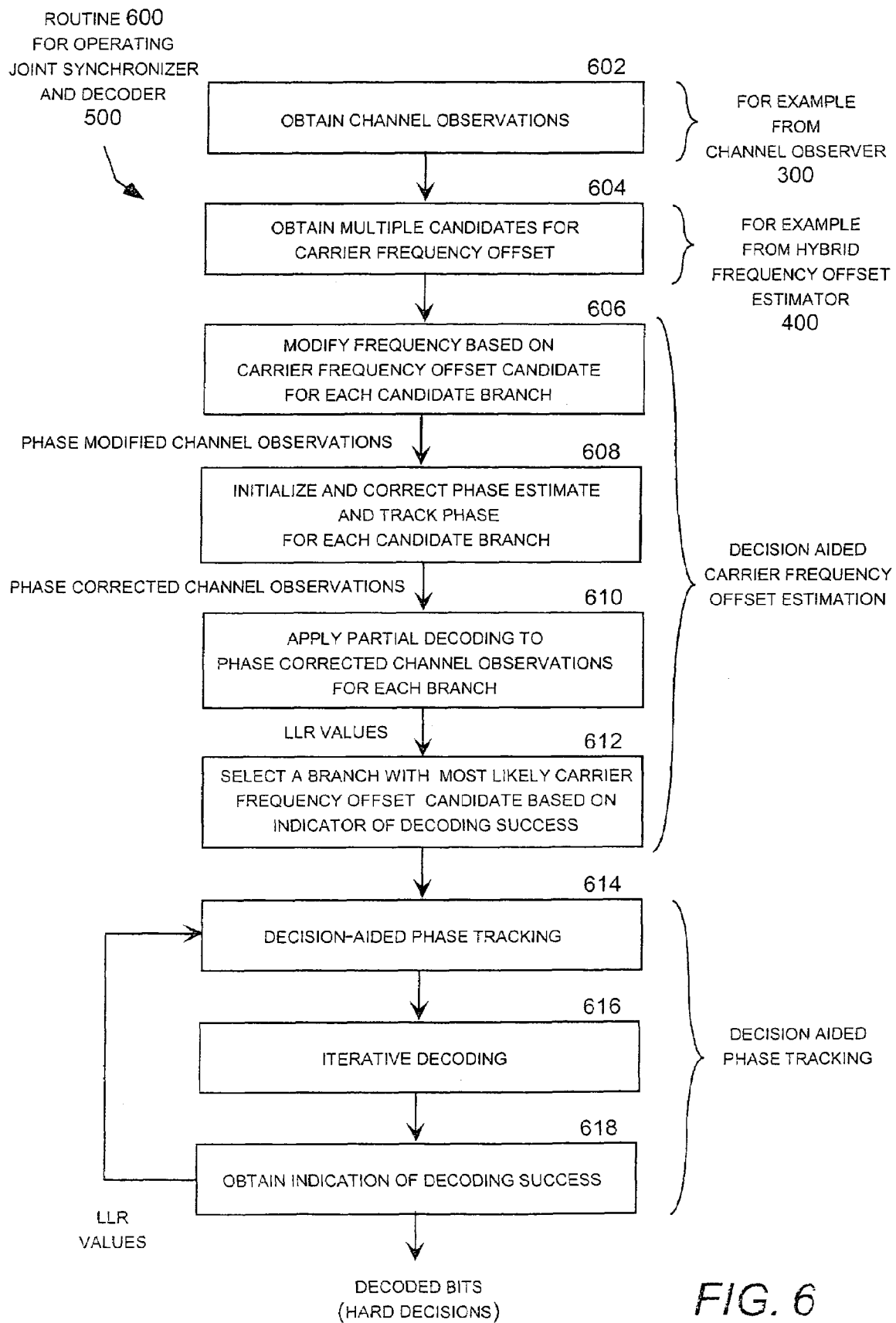
FIG. 6 is a logic flow diagram illustrating a method for operating a joint synchronizer and decoder implementing decision aided carrier frequency offset estimation and decision aided phase tracking.
Figure 12:
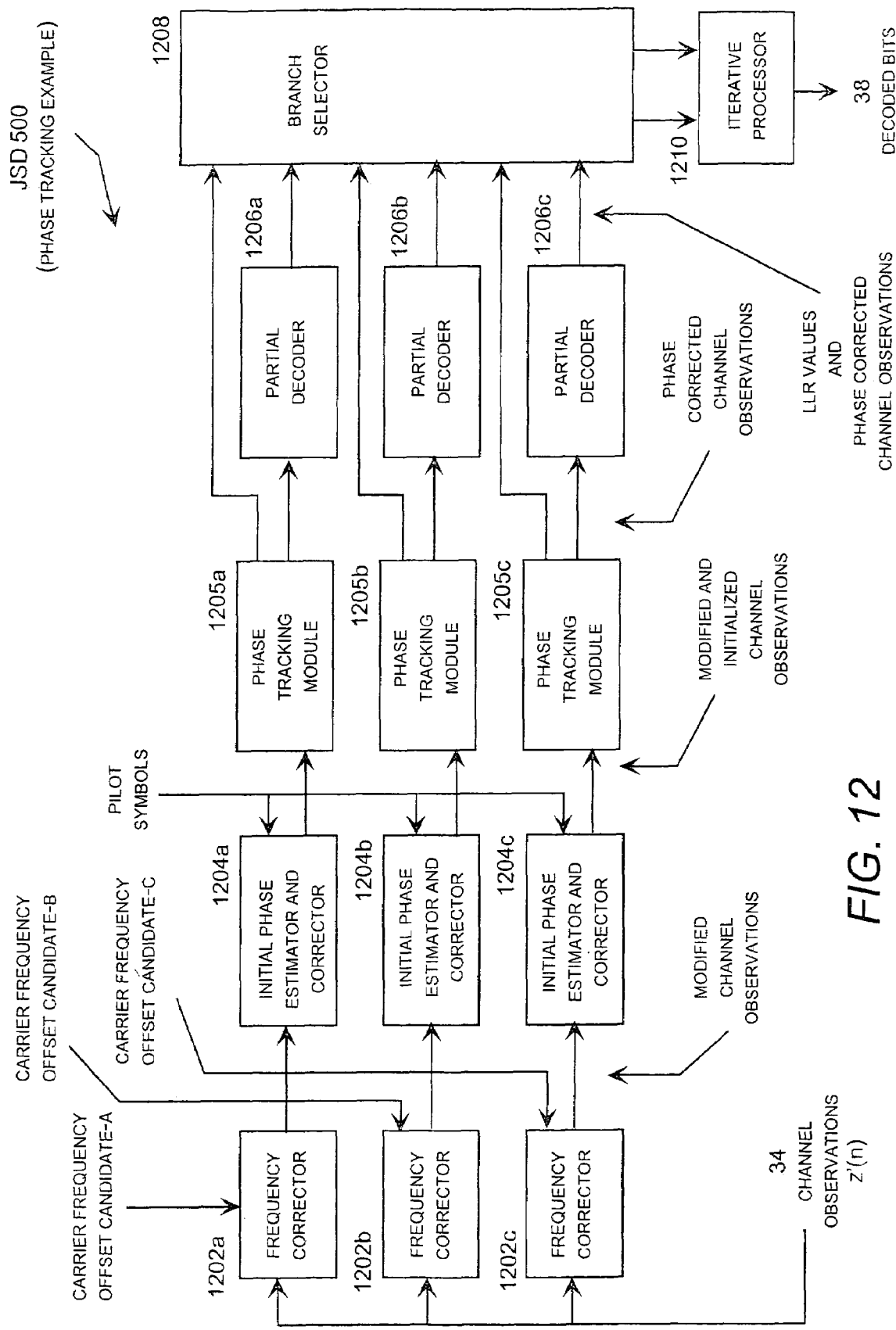
FIG. 12 is a block diagram of a joint synchronizer and decoder configured to implement decision aided carrier frequency offset estimation and decision aided phase tracking.

Step 512 is followed by step 514, in which the JSD applies decision aided synchronization to the input signal by using the selected signal distortion indicator to synchronize to the input signal. Step 514 is followed by step 516, in which the JSD applies a first iteration of decode processing to the input signal. Step 516 is followed by step 518, in which the JSD obtains an indication of decoding success for the decode processing. The JSD then loops through steps 514 through 518 for a sufficient number of iterations to complete the decode processing. Steps 514 through 518 are also referred to jointly as "decision aided synchronization and decoding" to indicate an indication of decoding success is used to synchronize to the input signal and decode the modulating data carried by the input signal., FIG. 6 is a logic flow diagram illustrating a method for operating a particular embodiment the JSD 500 shown on FIG. 7 for phase tracking in a satellite-based system operating under the DVB-RCS standard, as described previously with reference to FIGS. 1-4. In step 602, the JSD 500 obtains channel observations associated with an input signal from the channel observer 300 shown on FIG. 7. Step 602 is followed by step 604, in which the JSD 500 obtains multiple carrier frequency offset candidates from the hybrid carrier frequency offset estimator 400 shown on FIG. 7. Step 604 is followed by step 606, in which the JSD 500 modifies the channel observations based on the carrier frequency offset candidates to obtain phase modified channel observations for several processing branches in which each branch corresponds to one of the carrier frequency offset candidates. Step 606 is followed by step 608, in which the JSD 500 initializes and synchronizes the phase modified channel observations to obtain phase corrected channel observations for each processing branch. Step 608 is followed by step 610, in which the JSD 500 applies partial decoding to the phase corrected channel observations to obtain an indication of decoding success for each processing branch. In this particular example, a log-likelihood ratio (LLR) produced by the partial decoders 1204a-n shown on FIG. 12 provide the indications of decoding success. Step 610 is followed by step 612, in which the JSD 500 selects a processing branch with a most likely carrier frequency offset candidate for decode processing based on an analysis of the LLR values for the several processing branches. In this particular example, the absolute values of the LLR values corresponding to all of the symbols of a data packet are averaged and the candidate with the highest average LLR value is selected. Steps 606 through 612 are also referred to jointly as "decision aided carrier frequency offset estimation" to indicate that indications of decoding success, in this case the LLR values, are used to select a carrier frequency offset estimation candidate for decode processing.

Step 612 is followed by step 614, in which the JSD 500 produces corrected channel observations by applying decision aided phase tracking to the input signal using the select carrier frequency offset candidate to synchronize to modified and initialized carrier observations. Step 614 is followed by step 616, in which the JSD 500 applies a first iteration of decode processing to the corrected channel observations. Step 616 is followed by step 618, in which the JSD 500 obtains an indication of decoding success for the decode processing. In this embodiment, these are the LLR values produced by the decoder 1504 shown in FIG. 15. The JSD 500 then loops through steps 614 through 618 for a sufficient number of iterations to complete the decode processing. Steps 614 through 618 are also referred to jointly as "decision aided phase tracking" to indicate that an indication of decoding success, in the embodiment LLR values, are used to synchronize to the input signal and decode the modulating data carried by the input signal.

Figure 7:
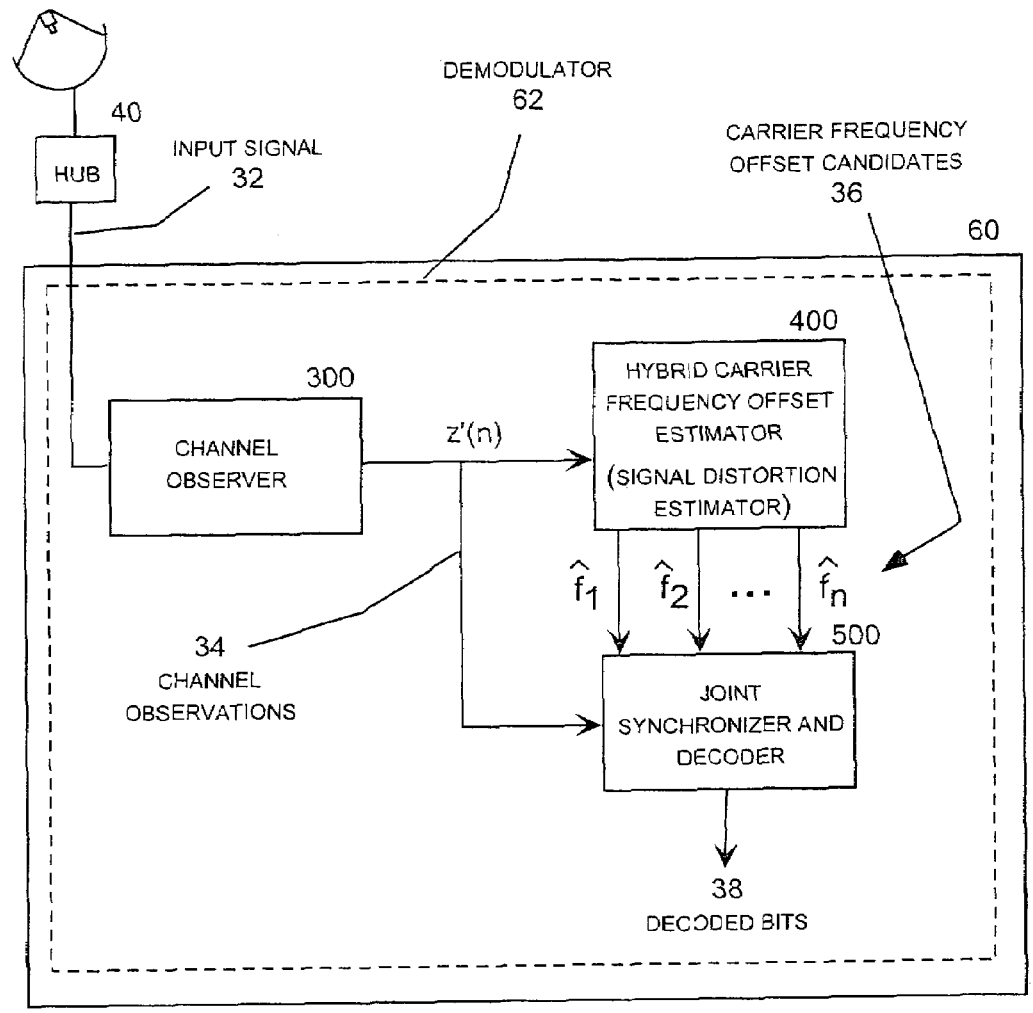
FIG. 7 is a block diagram of a return channel receiver in a satellite communication system including a joint synchronizer and decoder.

FIG. 7 is a block diagram of the return channel receiver 60 within the satellite communication system 10 shown on FIG. 1. The demodulator 62 in this particular embodiment includes a channel observer 300 that receives the analog input signal from the antenna of the satellite hub 30. The channel observer 300 extracts a channel observations 34 [Z'(n)] from the input signal. As noted previously, the channel observations contains the data symbols as corrupted by the carrier frequency offset. The channel observer 300 provides the channel observations 34 to a hybrid frequency offset estimator 400 and to the JSD 500. The hybrid frequency offset estimator 400 also provides multiple carrier frequency offset candidates 36 to the JSD 500, which selects a most likely candidate for the carrier frequency offset to synchronize with the channel observations and decode this signal to produce decoded bits 38 with increased reliability in a low signal-to-noise environment.

The joint synchronizer and decoder 500 is described in detail below, whereas the hybrid frequency offset estimator 400 is described in commonly owned and concurrently filed U.S. patent application Ser. No. 10/938,299 entitled "Hybrid Frequency offset estimator," which is incorporated herein by reference. As noted previously, cooperative operation with the hybrid frequency offset estimator 400 is one particular application of the joint synchronizer and decoder 500, which could alternatively obtain its input candidates from any suitable device.

Figure 8:
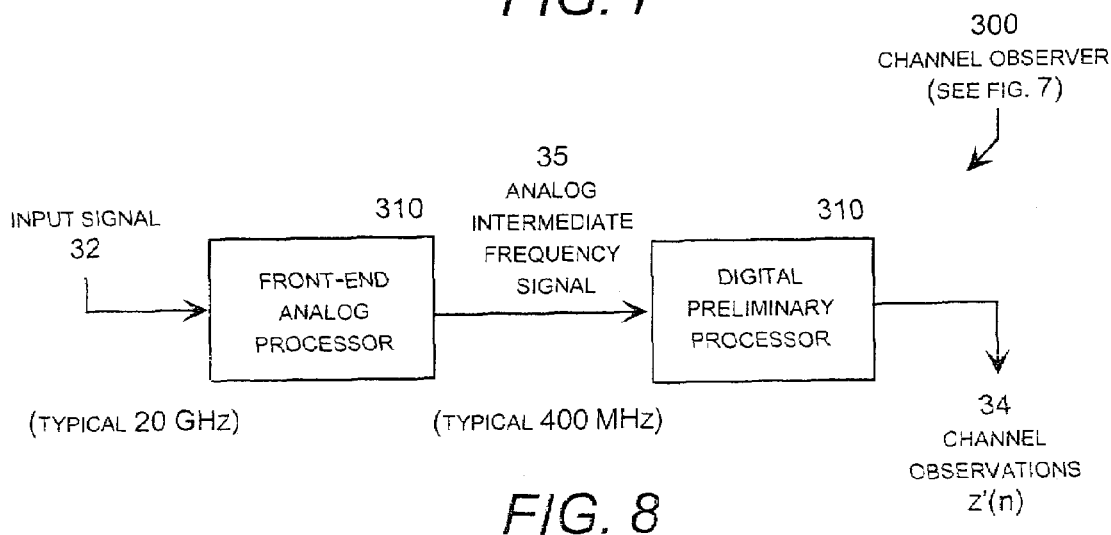
FIG. 8 is a block diagram of a prior art channel observer in a return channel receiver in a satellite communication system.

FIG. 8 is a block diagram of the channel observer 300, which is part of the hybrid frequency offset estimator 400 shown in FIG. 7. The channel observer 300 includes a front-end analog processor 310 and a digital preliminary processor 320, which are both conventional in design. Briefly described, the front-end analog processor 310 converts the analog input signal 32, typically a Ku or Ka band signal (e.g., 11 or 20 GHz) to an intermediate frequency signal 35 (e.g., 400 MHz) that is suitable for processing in conventional solid state hardware. The digital preliminary processor 320 digitizes the intermediate frequency signal 35 to produce the channel observations 34.

Figure 9:
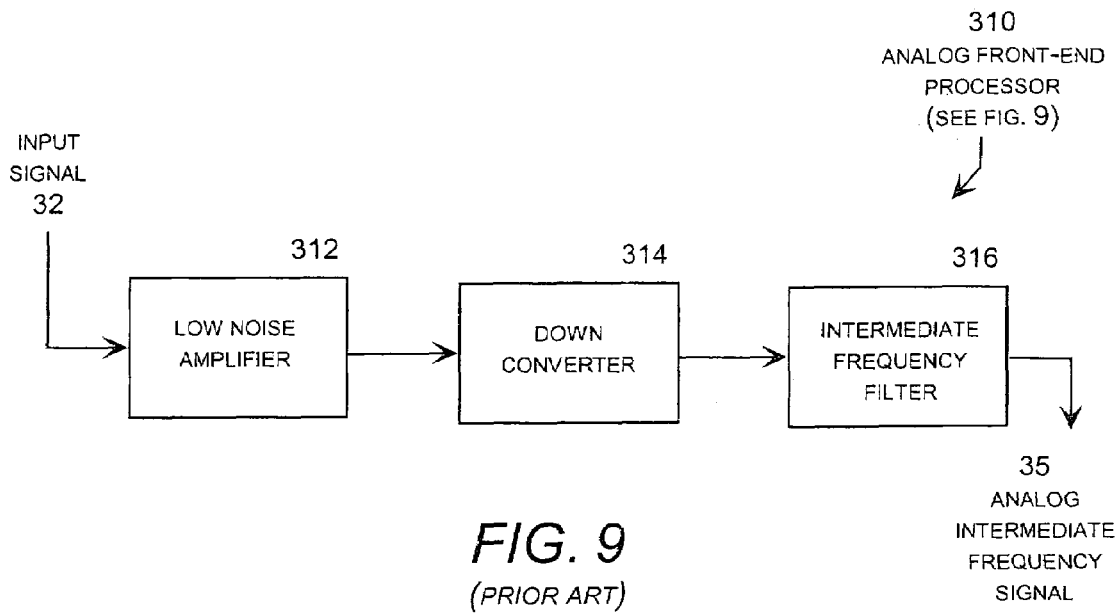
FIG. 9 is a block diagram of a prior art front-end analog processor in a return channel receiver in a satellite communication system.

FIG. 9 is a simplified block diagram of the front-end analog processor 310 shown on FIG. 8. This processor typically includes a low-noise amplifier 312 to amplify the input signal 32, a down converter 314 to convert the input signal to the intermediate frequency, and an intermediate frequency filter 316 to remove noise and produce the intermediate frequency signal 35. These functional blocks, which are well known in the field of signal processing, will not be further described in this specification.

Figure 10:
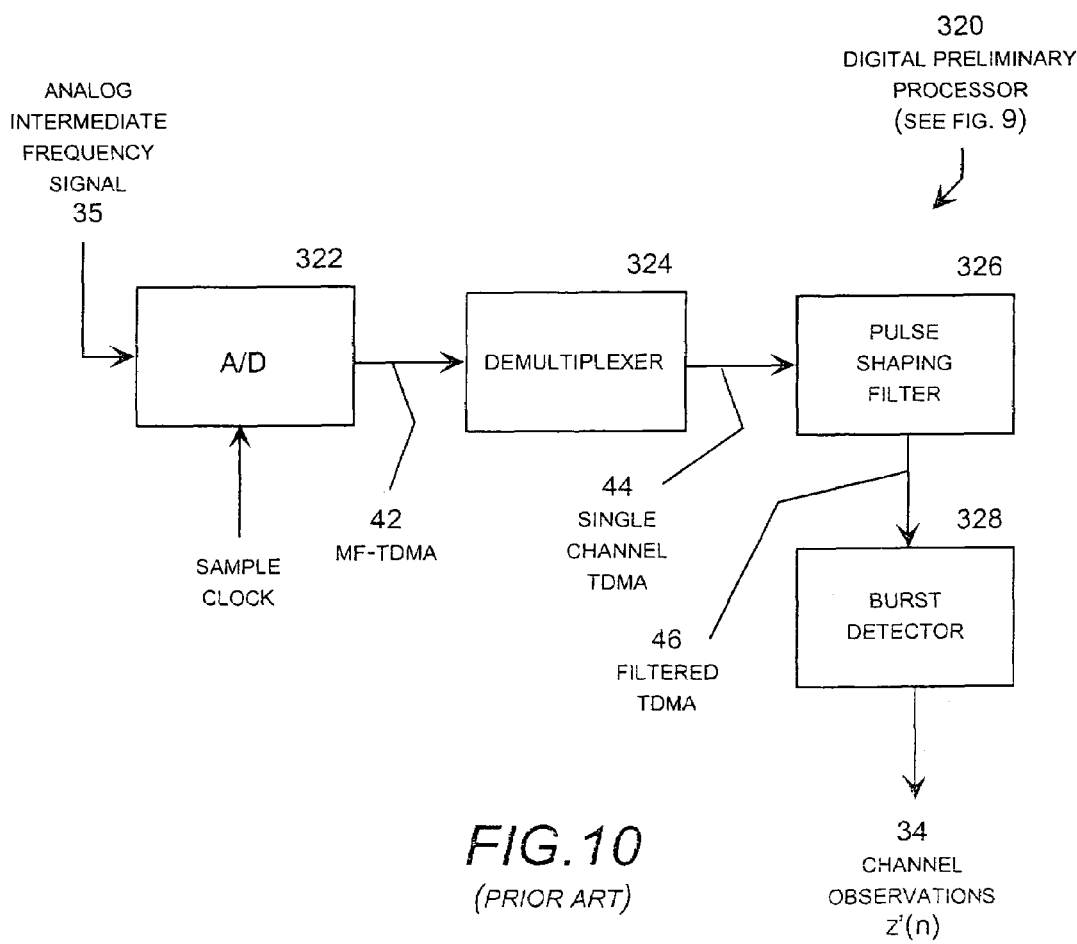
FIG. 10 is a block diagram of a prior art digital preliminary processor in a return channel receiver in a satellite communication system.

FIG. 10 is a block diagram of the digital preliminary processor 320 shown on FIG. 8. This processor includes an analog-to-digital converter 322, which converts the intermediate frequency signal 35 to a digital MF-TDMA signal 42. This signal is passed to a digital demutiplexer 324, which converts the digital MF-TDMA signal 42 into a single-channel TDMA signal 44. This signal is passed to a pulse shaping filter 326, which produces a filtered TDMA signal 46. This signal is passed to a burst detector and timing estimator 328 that detects the start of data bursts and outputs the timing-adjusted channel observation 34. Again, these functional blocks are well known in the field of signal processing and will not be further described in this specification.

Figure 11:
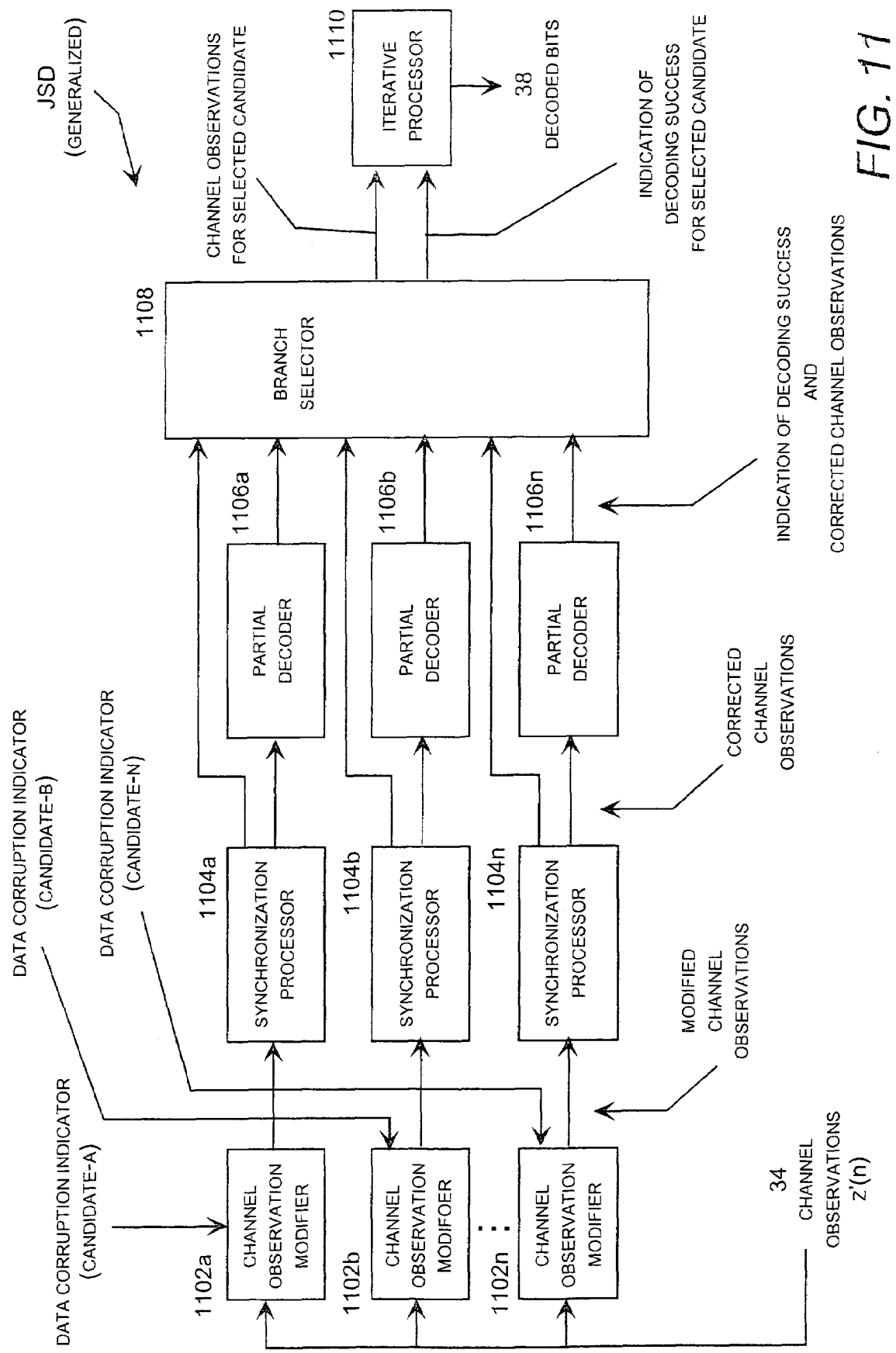
FIG. 11 is a block diagram of a generalized joint synchronizer and decoder.

FIG. 11 is a block diagram of a generalized JSD, which includes "n" parallel processing branches, a first branch associated with a first signal distortion indicator (candidate-A), a second branch associated with a second signal distortion indicator (candidate-B) and so forth up to an "nth" branch associated with an "nth" signal distortion indicator (candidate-N). The first branch includes a channel modifier 1102a, a synchronization processor 1104a, and a partial decoder 1106a. The second branch includes a channel modifier 1102b, a synchronization processor 1104b and a partial decoder 1106b. The "nth" branch includes a channel modifier 1102n, a synchronization processor 1104n and a partial decoder 1106n. Because each branch operates in the same manner except that the associated signal distortion indicator (candidate) is different, only the first branch will be described in detail.

The channel modifier 1102a receives an associated signal distortion indicator (candidate-A) and the channel observations Z'(n) 34. The signal distortion indicator (candidate-A) is a potential indicator of signal distortion in the channel observations Z'(n) 34, which typically modulates an input carrier signal. The channel modifier 1102a produces modified channel observations by removing potential signal distortion from the channel observations Z'(n) 34 using the signal distortion indicator (candidate-A). In this manner, the modified channel observations represent a test of the effectiveness of the signal distortion indicator (candidate-A) for use in removing signal distortion from the channel observations Z'(n) 34. That is, a subsequent comparison of the success of the several signal distortion indicator candidates in removing signal distortion from the channel observations Z'(n) 34 is used to select a most likely candidate for removing signal distortion from the channel observations Z'(n) 34.

The channel modifier 1102a passes the modified channel observations to the synchronization processor 1104a, which produces corrected channel observations by synchronizing the modified channel observations. Typically, the synchronization process involves phase tracking, timing tracking, amplitude tracking or another tracking function appropriate for the modulation technique employed in the channel observations Z'(n) 34. The synchronization processor 1104a then passes the corrected channel observations to the partial decoder 1106a, which decodes the corrected channel observations to obtain decoded data bits and an indication of decoding success. In particular, the partial decoder 1106a is typically a soft-input-soft-output iterative decode processor designed to perform decode processing through a number of iterations, for example ten iterations. However, the partial decoder 1106a only performs a small percentage of these iterations, for example one to three iterations, sufficient to obtain an indication of decoding success. Complete decode processing is not typically performed for each processing branch at this stage.

The partial decoder 1106a then passes the indication of decoding success for the first processing branch to a branch selector 1108. The synchronization processor 1104a also passes the corrected channel observations to the branch selector 1108. Each processing branch does the same, thereby providing the branch selector 1108 with the indication of decoding success and the corrected channel observations from each processing branch. The branch selector 1108 then selects a most likely branch corresponding to the most likely candidate for the signal distortion indicator based on a comparison of the indications of decoding success for the several processing branches.

The candidate selection process described above is referred to as "decision aided candidate selection" to indicate that the indications of decoding success for the several processing branches have been used to select a most likely processing branch and associated signal distortion indicator. Once the most likely processing branch has been selected, the branch selector 1108 passes the corrected channel observations and the indication of decoding success for the selected branch to an iterative processor 1110, which decodes the corrected channel observations to obtain the encoded data bits.

It should be noted that each individual processing branch shown in FIG. 11 is conventional in that this type of single-branch synchronization and decode processing is well known in the field of signal processing. On the other hand, the use of multiple branches associated with different signal distortion indicators (candidates) and the selection of one of the branches for decode processing based on an indication of decoding success for the several branches (i.e., decision aided candidate selection) is an improvement associated with the JSD according to present invention. A specific example of a JSD implementing decision aided candidate selection and decision aided synchronization and decoding is described in detail below with reference to a particular example configured to implement phase tracking within a return channel receiver in a DVB-RCS system using turbo coding and quadrature phase shift key (QPSK) data modulation.

The iterative processor 1110 typically implements a soft-input-soft-output decoding algorithm, such as a turbo decoding algorithm, several types of which are well known in the field of signal processing. Preferably, the iterative processor 1110 also implements decision aided synchronization and decoding, in which an indication of decoding success is used in the synchronization process. This type of decision aided synchronization and decoding is not conventional, and represents an improvement associated with the JSD according to present invention.

Figure 15:
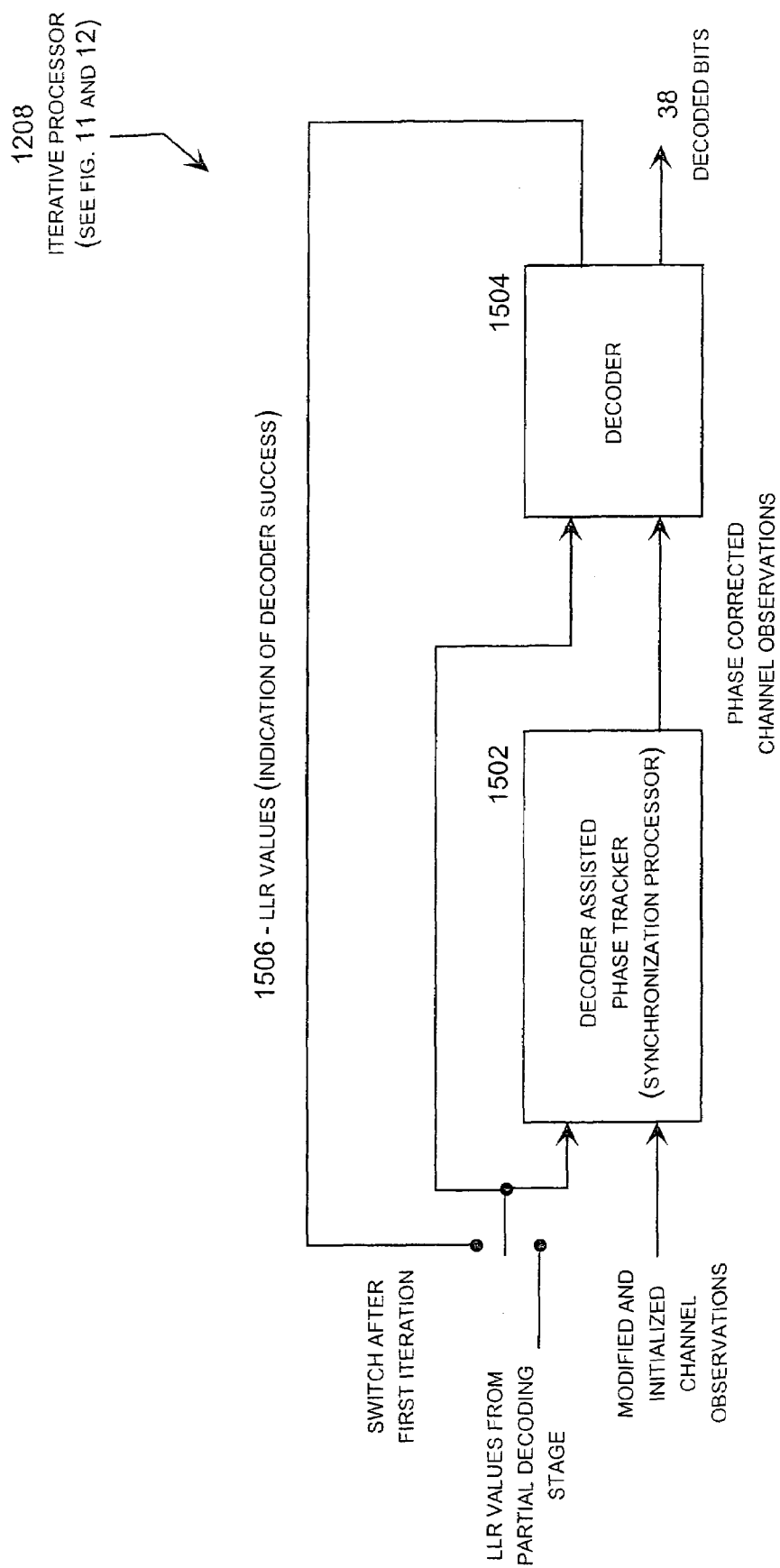
FIG. 15 is a block diagram of an iterative processor for the joint synchronizer and decoder.

FIG. 15 is a block diagram of the iterative processor 1110. This processor includes a synchronization processor 1502 and a decoder 1504. In the first iteration of the iterative processor, indications of decoder success are passed from the branch selector 1108 to the synchronization processor 1502, which in turn computes corrected channel observations based on the indication of decoder success and the modified and initialized channel observations. The operations within the synchronization processor 1502 are not necessarily the same as those within the synchronization processor 1104*a-n*.

The corrected channel observations are passed to the decoder 1504, which computes the decoded bits 38 as well as indication of decoder success 1506. The decoder 1504 is typically a soft-input-soft-output iterative decode processor designed to perform decode processing through a number of iterations, for example ten iterations. However, the decoder 1504 typically only performs a small fraction of these iterations, for example one to three iterations, sufficient to obtain an indication of decoding success 1506.

In second and subsequent iterations of the iterative processor, the indication of decoder success 1506 is passed to the synchronization processor 1502. FIG. 12 is a block diagram of the JSD 500 shown in FIG. 7, which is configured to implement decision aided carrier frequency offset estimation (i.e., a example of decision aided candidate selection) and decision aided phase tracking (i.e., an example of decision aided synchronization and decoding) within a burst-mode DVB-RCS system. The JSD 500 typically applies the signal processing methodology described below on a per-packet bases. That is, the JSD 500 applies decision aided candidate selection and decision aided synchronization, as described below, to the symbols of an entire packet. The process is then repeated for each packet processed by the JSD 500.

The JSD 500 includes three parallel processing branches, a first branch associated with a first carrier frequency offset (candidate-A), a second branch associated with a second carrier frequency offset (candidate-B) and a third branch associated with a third carrier frequency offset (candidate-C). The first branch includes a frequency corrector 1202*a*, an initial phase estimator and corrector 1204*a*, a phase tracking module 1205*a*, and a partial decoder 1206*a*. The second branch includes a frequency corrector 1202*b*, an initial phase estimator and corrector 1204*b*, a phase tracking module 1205*b*, and a partial decoder 1206*b*. The third branch includes a frequency corrector 1202*c*, an initial phase estimator and corrector 1204*c*, a phase tracking module 1205*c*, and a partial decoder 1206*c*. Because each branch operates in the same manner except that the associated carrier frequency offset candidate is different, only the first branch will be described in detail.

The frequency corrector 1202*a* receives an associated carrier frequency offset (candidate-A) from the hybrid carrier frequency estimator 300 shown on FIG. 7. The frequency corrector 1202*a* also receives the channel observations Z'(n) 34 from the channel observer 300 shown on FIG. 7. The carrier frequency offset (candidate-A) is a potential indicator of carrier frequency offset in the channel observations Z'(n) 34. As described previously with reference to FIGS. 1-4, the channel observations modulate an input signal 32 with encoded data using QPSK modulation. The carrier frequency offset is a source of signal distortion that must be removed before the encoded data can be demodulated from the channel observations.

The frequency corrector 1202*a* produces modified channel observations by removing the carrier frequency offset (candidate-A) from the channel observations Z'(n) 34. In this manner, the modified channel observations represent a test of the effectiveness of "candidate-A" for use in removing carrier frequency offset from the channel observations Z'(n) 34. That is, a subsequent comparison of the success of the several candidates in removing carrier frequency offset from the channel observations Z'(n) 34 is used to identify a most likely candidate that correctly represents the carrier frequency offset in the channel observations Z'(n) 34. The frequency corrector 1202*a* is well known in the field of signal processing, and will not be descried further in this specification.

Figure 13:
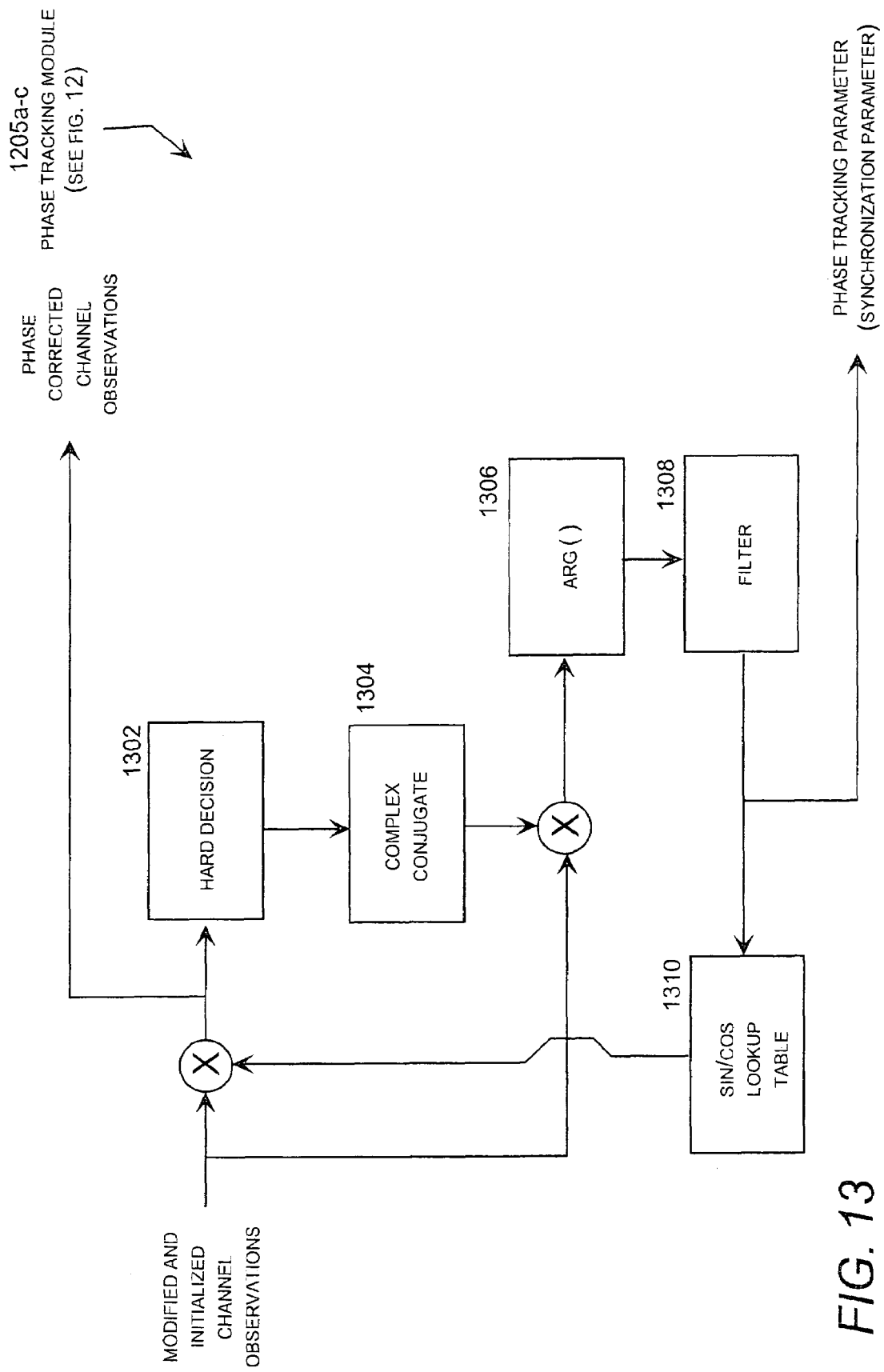
FIG. 13 is a block diagram of a phase tracking module for the joint synchronizer and decoder.

The channel modifier 1202*a* passes the modified channel observations to the initial phase estimator and corrector 1204*a*, which adjusts the phase of the modified channel observations in accordance with an initial phase estimate. In other words, the tracking process is initialized by the initial phase estimator 1204*a*. This module ensures that the channel observations are initialized in such a way that the phase offset is near zero at the start of the sequence of channel observations Z'(n). The initial phase estimator and corrector 1204*a* is well known in the field of signal processing, and will not be descried further in this specification. The initial phase estimator and corrector 1204*a* passes the initialized and modified channel observations to the phase tracking module 1205*a*, which tracks the phase of the initialized and modified channel observations to produce phase corrected channel observations. Although the phase tracking module 1205*a* is well known in the field of signal processing, a typical block diagram for this module is shown in FIG. 13 for the purpose of distinguishing this conventional module from the decision aided phase tracking module 1604 shown in FIGS. 16 and 17.

The phase tracking module 1205*a* then passes the phase corrected channel observations to the partial decoder 1206*a*, which demodulates the phase corrected channel observations to obtain decoded data bits and an indication of decoding success. In this instance, the indication of decoding success is represented by log-likelihood ratios (LLRs) produced by the partial decoder 1206a using a soft-input-soft-output turbo decoding algorithm. Specifically, the partial decoder 1206a produces one LLR for each symbol modulating the channel observations Z'(n) 34, and the LLRs for a complete data packet are processed together on a per-packet basis. It should be appreciated that the partial decoder 1206a is an. iterative decode processor designed to perform a turbo decoding algorithm through a number of iterations, for example ten iterations. However, the partial decoder 1206a only performs a small percentage of these iterations, for example one to three iterations, sufficient to obtain suitable LLRs for the data packet being processed. Complete decode processing is not typically performed for each processing branch at this stage.

The partial decoder 1206a then passes the LLRs for the first processing branch to a branch selector 1208. The phase tracking module 1204a also passes the phase corrected channel observations to the branch selector 1208. Each processing branch does the same, thereby providing the branch selector 1208 with the LLRs and the phase corrected channel observations from each: processing branch. The branch selector 1208 then selects a most likely branch corresponding to the most likely carrier frequency offset candidate based on a comparison of the LLRs for the several processing branches. Specifically, the absolute values of the LLRs for the data packet being processed are averaged, and the branch selector 1208 selects the carrier frequency offset candidate producing the largest averaged absolute values of the LLRs for the packet as the most likely candidate.

The candidate selection process described above is referred to as "decision aided carrier frequency estimation" to indicate that the indications of decoding success for the several processing branches have been used to select a most likely processing branch and associated carrier frequency offset. Once the most likely processing branch has been selected, the branch selector 1208 passes the phase corrected channel observations and the LLRs for the selected branch to an iterative processor 1210, which decodes the phase corrected channel observations to obtain the encoded data bits. The iterative processor 1210 is described in detail below with reference to FIGS. 14-17.

FIG. 13 is a block diagram of the prior art phase tracking module 1205a-c shown on FIG. 12. The phase tracking module 1205a-c includes a hard decision module 1302 that assigns a "hard value" corresponding to a nominal QPSK phase orientation to each symbol in the modified and initialized channel observations received from the initial phase estimator and corrector 1204 shown on FIG. 12. Although there may be uncertainly in the hard decision at this point, a specific hard decision is made based on the best information currently available (i.e., at the phase corrected channel observation) to facilitate the phase tracking process.

The hard decision module 1302 passes the hard decision QPSK phase orientation to a complex conjugate module 1304, which computes the complex conjugate of the hard decision QPSK phase orientation. The modified and initialized channel observations are then multiplied by the complex conjugate of the hard decision QPSK phase orientation. This removes the QPSK modulation from the modified and initialized channel observations, leaving only a phasor representing the phase difference between the modified and initialized channel observations and the hard decision QPSK phase orientation. This phase difference represents a detected phase error in the modified and initialized channel observations. This detected phase error is then fed to an argument processor 1306, which determines the phase angle of the detected phase error. The phase angle of the detected phase error is then passed to a low pass filter 1308 to remove noise. The result is a phase tracking parameter (i.e., a particular example of a synchronization parameter) representing the phase angle of the detected phase error in the modified and initialized channel observations is then provided as an output of the phase tracking module 1205a.

This phase tracking parameter is also fed back for error correction. Specifically, a phasor corresponding to a negative or canceling complement of the phase angle of the detected phase error is determined by a sin/cos lookup table 1310, and this phasor is then multiplied by the modified and initialized channel observations to remove the detected phase error from the modified and initialized channel observations. This multiplication process results in the phase corrected channel observation, which is also an output of the phase tracking module 1205a. As noted previously, this phase tracking process well known in the field of signal processing.

Figure 14:
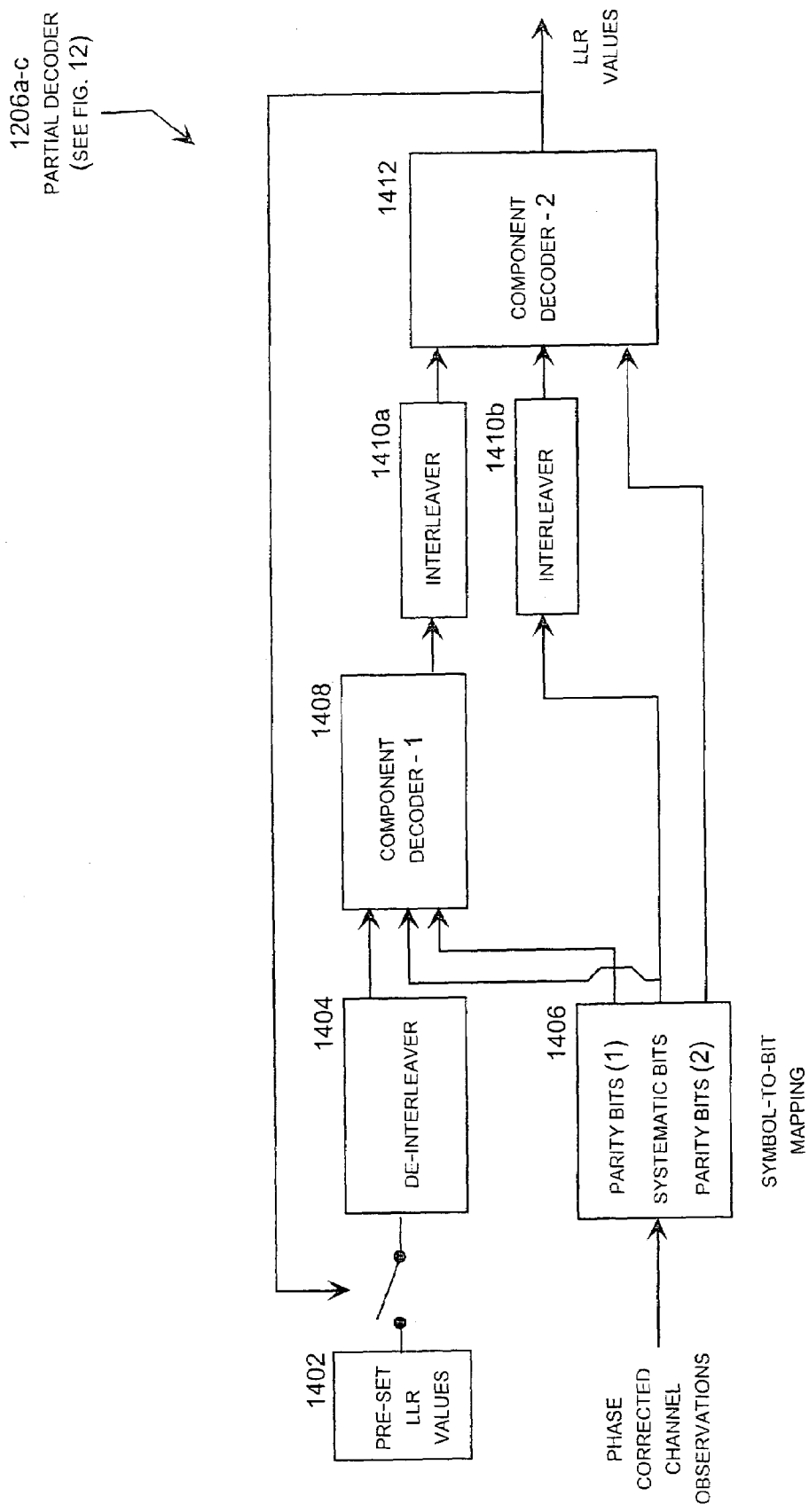
FIG. 14 is a block diagram of a partial decoder for the joint synchronizer and decoder.

FIG. 14 is a block diagram of the prior art partial decoder function 1206a-c for the turbo code of the DVB-RCS standard. The decoder implements an iterative soft-input-soft-output algorithm, typically a turbo decoding algorithm, which is well known in the signal processing industry. The phase corrected channel observations received from the phase tracking module 1205a are mapped into bit-wise elements for systematic and parity bits, respectively, by the symbol-to-bit mapping function 1406. The bit-wise elements for the systematic bits and for the parity bits of the first component of the composite code are forwarded to the decoder 1408 for the first component code. The bit-wise components for the parity bits of the second component of the composite code are forwarded to the decoder 1412 for the second component code. The bit-wise components for the systematic bits are also forwarded the decoder 1412 for the second component code; however, these are passed through interleaver 1410b in order to match the order in which they were encoded.

In the first iteration of the decoder 1206a-c, pre-set LLR values representing the absence of prior knowledge about the information contained in the packet are passed to the decoder for the first component code 1408, through de-interleaver 1404. The decoder for the first component code 1408 computes improved LLR values for the systematic bits of the packet, using a computational technique well known in the signal processing industry. The improved LLR values are then passed as input to the decoder for the second component code 1412, but are passed through interleaver 1410a in order to match the encoding order of the second component code. The decoder for the second component code 1412 computes improved log-likelihood ratios for the systematic bits of the packet, using a computational technique well known in the signal processing industry.

The LLRs computed by the second decoder 1412 are output to the branch selector 1208. They are also provided as input to the decoder for the first component code 1408 in the subsequent iteration. The input to the first decoder 1408 is passed through de-interleaver 1404, in order to match the order of encoding in the first component code. The number of iterations performed for each decoder 1206a-c is an application-dependent design parameter.

FIG. 15 is a block diagram of the iterative processor 1208, which is shown in FIG. 12. The iterative processor 1208 includes a decoder assisted phase tracker 1502 and a decoder 1504. The decoder assisted phase tracker 1502 is a type of synchronization processor configured to implement phase tracking. The decoder assisted phase tracker 1502 produces phase corrected channel observations based on modified and initialized channel observations and LLR values for the data packet being processed. The structure of the decoder assisted phase tracker 1502 and the functions implemented to compute the phase corrected channel observations are described in greater detail with reference to FIG. 16.

The decoder 1504 processes the corrected channel observations and the LLR values to extract the decoded bits 38 through an iterative decoding process, which is similar to the iterative process described with reference to FIG. 14. The important difference is that the LLR values produced by the decoder 1504 are also fed back to the decoder assisted phase tracker 1502 for use in decision aided phase tracking. In addition, the feedback loop 1506 includes a switch that feeds the LLR values from the partial decoding stage to the decoder assisted phase tracker 1502 for the first iteration. After that initial iteration, the switch feeds the LLR values from the decoder 1504 to the decoder assisted phase tracker 1502 to implement the feedback loop.

Figure 16:
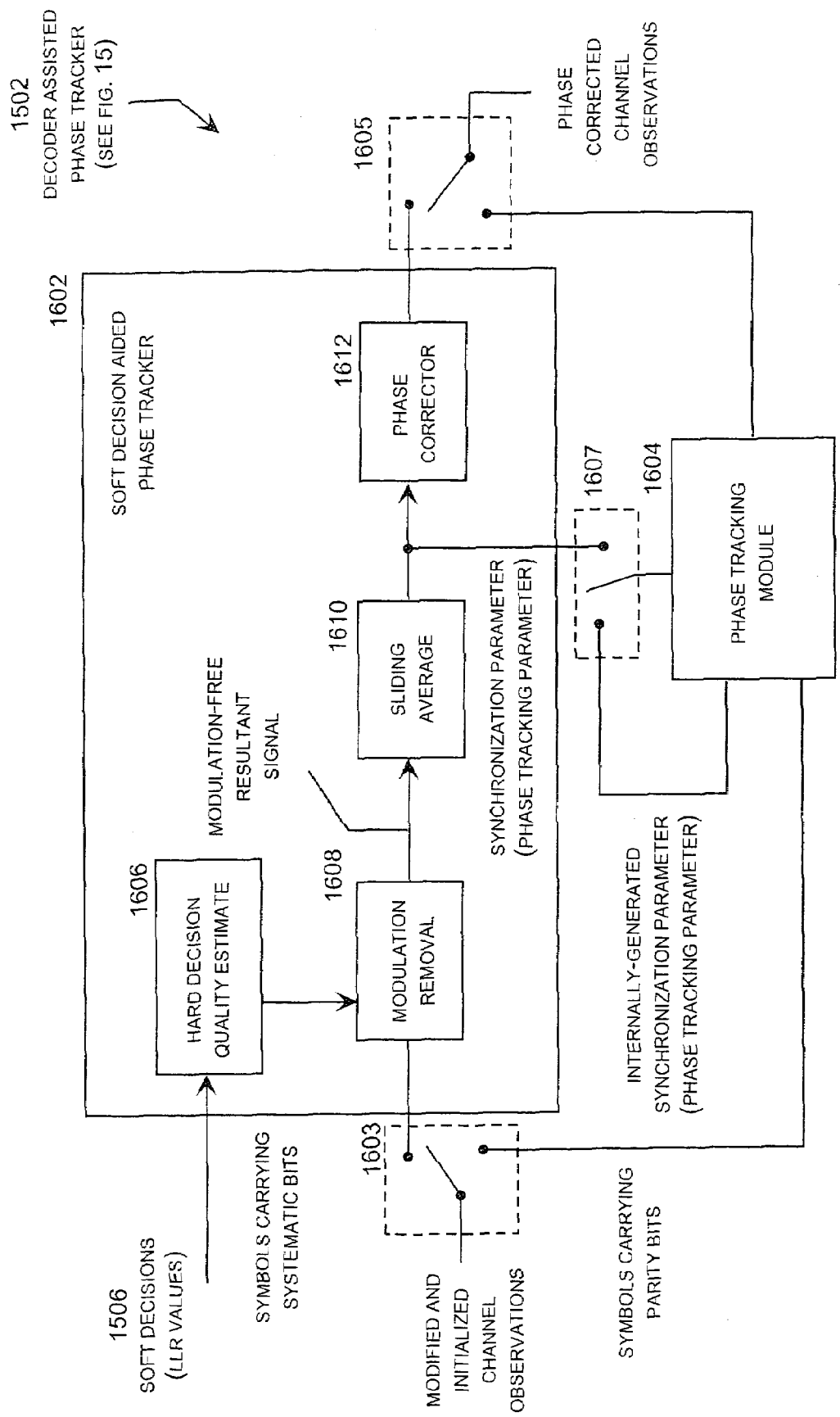
FIG. 16 is a block diagram of a decoder assisted phase tracker for the iterative processor of the joint synchronizer and decoder.

FIG. 16 is a block diagram of the decoder assisted phase tracker 1502 shown in FIG. 15. The decoder assisted phase tracker 1502 includes a soft decision aided phase tracker 1602 and a decision aided phase tracking module 1604. The soft decision aided phase tracker 1602 uses indications of decoding success, in this case LLR values, in the phase tracking process for symbols carrying the systematic bits. The decoder assisted phase tracker 1502 receives the LLR values 1506 from the decoder 1504 and the initialized and modified channel observations as inputs, and produces phase corrected channel observations as an output.

More specifically, the decoder assisted phase tracker 1502 includes a switch 1603 that supplies symbols from the initialized and modified channel observations carrying systematic bits to the soft decision aided phase tracker 1602. The switch 1603 also supplies symbols from the initialized and modified channel observations carrying parity bits to the decision aided phase tracking module 1604. The decoder assisted phase tracker 1502 also includes a switch 1605 that supplies corrected channel observations for the systematic bits from the soft decision aided phase tracker 1602 as an output. The switch 1605 also supplies corrected channel observations for the parity bits from the decision aided phase tracking module 1604 as an output. In other words, the corrected channel observations for the systematic bits are produced by the soft decision aided phase tracker 1602, whereas the corrected channel observations for the parity bits are produced by the decision aided phase tracking module 1604.

In addition, the soft decision aided phase tracker 1602 includes a hard decision and quality estimate module 1606 that receives the LLR values 1506 from the decoder 1504. The hard decision and quality estimate module 1606 assigns a "hard value" corresponding to QPSK phase orientation to each symbol based on the LLR values. Although there may be uncertainty in the hard decision at this point, a specific hard decision is made based on the best information currently available (i.e., at the present iteration) to facilitate the phase tracking process. The LLR value also indicates a likelihood or quality estimate for this hard decision. As noted previously, the LLR values typically increase with successive iterations indicating increasing likelihood or quality of the hard decisions.

The hard decision and quality estimate are then fed to a modulation removal module 1608, which also receives the initialized and modified channel observations carrying the systematic bits. The modulation removal module 1608 then removes the modulation from the initialized and modified channel observations through multiplication with the complex conjugate of the associated hard decision. The result of this process is a phase error, which the modulation removal module 1608 scales by the associated quality estimate to produce a modulation-free resultant signal. This signal is then passed to a sliding average module 1610, which computes a sliding average of the modulation-free resultant signal, typically over a block of 50 symbols, to produce a phase tracking parameter representative of the phase error in the initialized and modified channel observations for the systematic bits. The phase tracking parameter is then passed to a phase corrector 1612, which removes the phase error represented by the phase tracking parameter from the initialized and modified channel observations for the systematic bits to compute the phase corrected channel observations for the systematic bits.

As noted previously, the symbols carrying the parity bits are passed to the decision aided phase tracking module 1604. The phase tracking parameter is also fed from the sliding average module 1610 of the soft decision aided phase tracker 1602 to the decision aided phase tracking module 1604. The decision aided phase tracking module 1604 also includes a switch 1607 that switches between the phase tracking parameter received from the soft decision aided phase tracker 1602 for the first symbol and an internally-generated phase tracking parameter for subsequent symbols.

Figure 17:
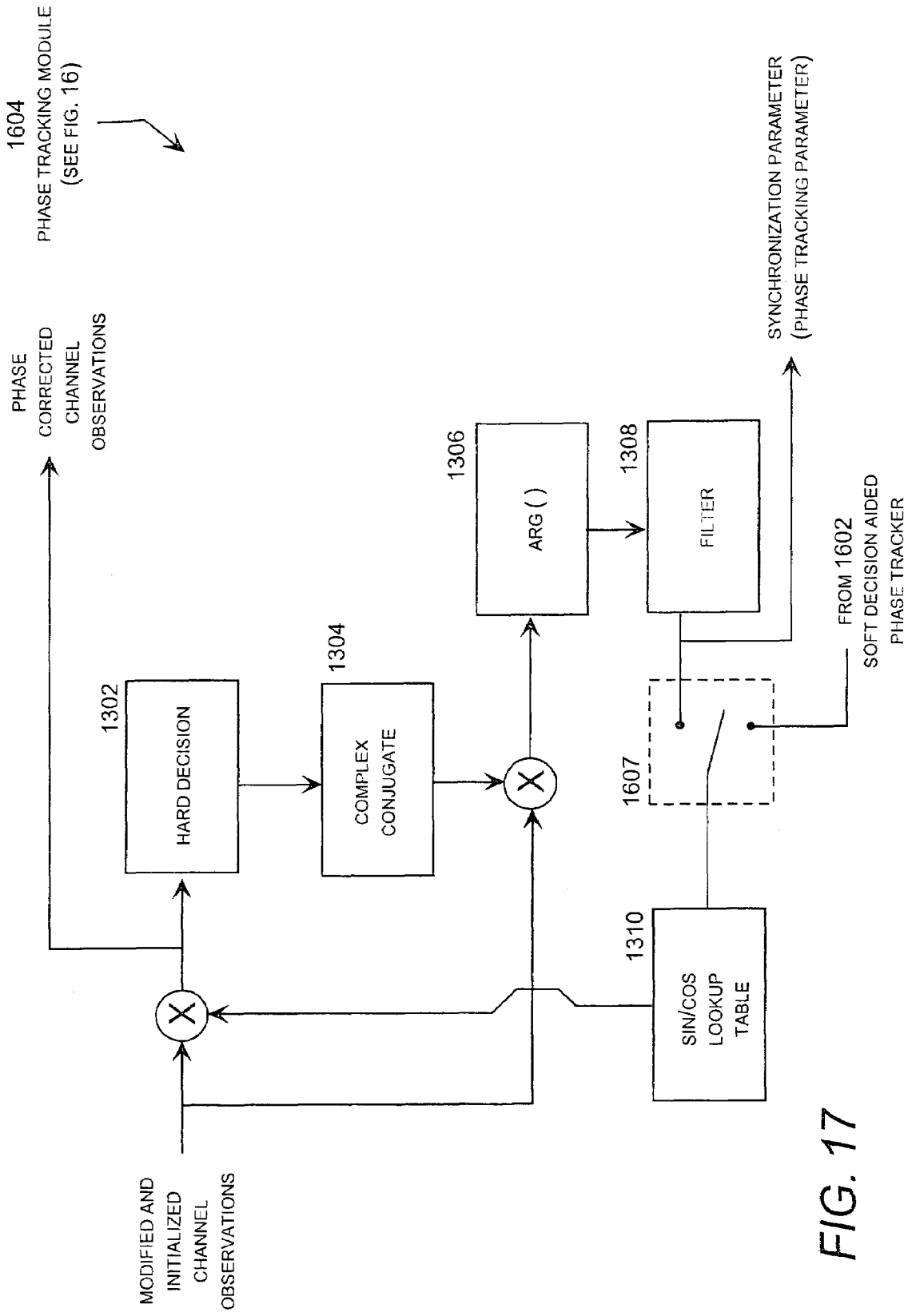
FIG. 17 is a block diagram of a phase tracking module for the decoder assisted phase tracker.

FIG. 17 is a block diagram of the phase tracking module 1604, which is similar to the prior art phase tracking module 1205*a-c* described previously except for the presence of the switch 1607, which is used to switch between the phase tracking parameter received from the soft decision aided phase tracker 1602 for its first iteration and an internally-generated phase tracking parameter for subsequent iterations.

In view of the foregoing, it will be appreciated that present invention provides an improved joint synchronizer and decoder that is configured to implement decision aided candidate selection and decision aided synchronization and decoding. More specifically, the invention select a carrier frequency offset by selecting among a number of candidates for this parameter based on an indication of decoding success. The invention may also implement decision aided phase tracking based on an indication of decoding success. It should be understood that the foregoing relates only to the exemplary embodiments of the present invention, and that numerous changes may be made therein without departing from the spirit and scope of the invention as defined by the following claims.

The invention claimed is:

1. A joint decoder and synchronizer for operating on an input signal modulated with encoded data, having an iterative processor comprising:
    a synchronization processor operative for receiving and synchronizing to input channel observations associated with the input signal;
    a decoder operative for decoding synchronized channel observations received from the synchronization processor and producing an associated indication of decoding success;
    a feedback loop supplying the indication of decoding success to the synchronization processor;
    the synchronization processor further operable for adjusting its synchronization to the channel observations based on the indication of decoding success; and
    wherein the synchronization processor further comprises a soft decision aided synchronization processor operative for computing a synchronization parameter based on the indication of decoding success, the soft decision aided synchronization processor further operative for computing a corrected channel observation based on the input channel observations and the synchronization parameter.

2. The joint decoder and synchronizer of claim 1, wherein the indication of decoding success comprises a log likelihood ratio produced by the decoder.

3. A joint decoder and synchronizer for operating on an input signal modulated with encoded data, including an iterative processor comprising:
- a decoder assisted phase tracker operative for receiving and synchronizing to channel observations associated with the input signal and producing phase corrected channel observations;
- a decoder operative for decoding the phase corrected channel observations received from the decoder assisted phase tracker and producing an associated indication of decoding success;
- a feedback loop supplying the indication of decoding success to the decoder assisted phase tracker;
- the decoder assisted phase tracker further operable for adjusting its synchronization to the channel observations based on the indication of decoding success; and
- wherein the encoded data define systematic bits representing unknown data and parity bits derived from the systematic bits for integrity checking, and wherein the decoder assisted phase tracker further comprises a soft decision aided phase tracker operative for commuting a phase tracking parameter based on the systematic bits and the indication of decoding success, the soft decision aided phase tracker further operable for computing corrected channel observations based on the systematic bits and the phase tracking parameter.

4. The joint decoder and synchronizer of claim 3, wherein the indication of decoding success comprises a log likelihood ratio produced by the decoder.

5. The joint decoder and synchronizer of claim 3, wherein the decoder assisted phase tracker further comprises:
- a phase tracking module operative for receiving the phase tracking parameter from the soft decision aided phase tracker and computing a corrected channel observations based on the parity bits and the phase tracking parameter; and
- a switch operative for feeding the systematic bits to the soft decision aided phase tracker, and for feeding the parity bits to the phase tracking module.

6. The joint decoder and synchronizer of claim 5, wherein the phase tracking module further comprises a feedback loop comprising a phase tracking parameter associated with the corrected channel observations.

7. The joint decoder and synchronizer of claim 5, wherein the soft decision aided phase tracker computes the phase tracking parameter by removing modulation from the channel observations, obtaining a resultant signal by weighting the modulation-free channel observations by a representation of the indication of decoding success, and computing a sliding average of the resultant signal.

* * * * *